(12) United States Patent
Watanabe

(10) Patent No.: US 10,895,733 B2
(45) Date of Patent: Jan. 19, 2021

(54) MICROSCOPE SYSTEM

(71) Applicant: OLYMPUS CORPORATION, Hachioji (JP)

(72) Inventor: Hiroshi Watanabe, Hino (JP)

(73) Assignee: OLYMPUS CORPORATION, Tokyo (JP)

(*) Notice: Subject to any disclaimer, the term of this patent is extended or adjusted under 35 U.S.C. 154(b) by 322 days.

(21) Appl. No.: 15/981,630

(22) Filed: May 16, 2018

(65) Prior Publication Data
US 2018/0259764 A1 Sep. 13, 2018

Related U.S. Application Data

(63) Continuation of application No. PCT/JP2016/087422, filed on Dec. 15, 2016.

(30) Foreign Application Priority Data

Dec. 22, 2015 (JP) .................... 2015-249899

(51) Int. Cl.
G02B 21/36 (2006.01)
G02B 21/26 (2006.01)
(Continued)

(52) U.S. Cl.
CPC ........... *G02B 21/367* (2013.01); *G02B 21/00* (2013.01); *G02B 21/125* (2013.01);
(Continued)

(58) Field of Classification Search
CPC ...... G02B 21/125; G02B 21/00; G02B 21/06; G02B 21/02; G02B 21/0016;
(Continued)

(56) References Cited

U.S. PATENT DOCUMENTS

| 2013/0016885 A1 | 1/2013 | Tsujimoto |
| 2014/0198197 A1 | 7/2014 | Kaminaga |
| 2015/0185465 A1 | 7/2015 | Karube |
| 2016/0291302 A1 | 10/2016 | Schnitzler |
| 2017/0024859 A1 | 1/2017 | Schnitzler et al. |

FOREIGN PATENT DOCUMENTS

| JP | 2006337470 A | 12/2006 |
| JP | 2014055776 A | 3/2014 |

(Continued)

OTHER PUBLICATIONS

International Search Report (ISR) dated Mar. 21, 2017 issued in International Application No. PCT/JP2016/087422.

(Continued)

*Primary Examiner* — Jie Lei
(74) *Attorney, Agent, or Firm* — Holtz, Holtz & Volek PC

(57) ABSTRACT

A microscope system includes: a stage on which a specimen is mounted; one or more light sources configured to emit light irradiating the specimen; an illumination optical system configured to irradiate the specimen with the light; an operating unit configured to receive selection of the light sources and setting of the state and/or an amount of light; a focusing unit configured to move in a direction orthogonal to a mounting surface and adjust the distance between the stage and an objective lens; an imaging unit configured to image the observation image of the specimen and generate image data; and a combined image generating unit configured to combine the image data and generate combined image data. The microscope system enables selection of the state of optical elements constituting the illumination optical system and selection of the type, the state, and an amount of light of the light source.

11 Claims, 30 Drawing Sheets

(51) Int. Cl.
*G02B 21/12* (2006.01)
*G02B 21/24* (2006.01)
*G02B 21/00* (2006.01)

(52) U.S. Cl.
CPC ............ *G02B 21/241* (2013.01); *G02B 21/26* (2013.01); *G02B 21/36* (2013.01)

(58) Field of Classification Search
CPC .... G02B 21/025; G02B 21/082; G02B 21/36; G02B 21/367; G02B 21/365; G02B 21/368; G02B 21/361; G02B 21/26; G02B 21/12; G02B 21/24; G02B 21/241; G06T 5/007; G06T 11/60; G06T 7/0012; G06T 7/11
USPC .... 359/363, 368, 383, 385, 390; 348/79, 80; 382/128, 203, 274
See application file for complete search history.

(56) References Cited

FOREIGN PATENT DOCUMENTS

| | | |
|---|---|---|
| JP | 2014077685 A | 5/2014 |
| JP | 2015127772 A | 7/2015 |
| JP | 2016009035 A | 1/2016 |
| JP | 2017027055 A | 2/2017 |
| WO | 2015001007 A1 | 1/2015 |

OTHER PUBLICATIONS

Written Opinion dated Mar. 21, 2017 issued in International Application No. PCT/JP2016/087422.
Extended European Search Report (EESR) dated Jul. 31, 2019 issued in counterpart European Application No. 16878543.4.
Tian, et al., "3D Differential Phase-Contrast Microscopy with Computational Illumination using an LED Array", Optics Letters, Feb. 28, 2014, vol. 39, No. 5, p. 1326.

MICROSCOPE SYSTEM

CROSS-REFERENCE TO RELATED APPLICATION

This application is a continuation of International Application No. PCT/JP2016/087422, filed on Dec. 15, 2016, which claims the benefit of priority from Japanese Patent Application No. 2015-249899, filed on Dec. 22, 2015, the entire contents of which are incorporated herein by reference.

BACKGROUND

The present disclosure relates to a microscope system.

In recent years, in a microscope system for observing specimens, there is a known technology for generating an extended focus image (hereinafter, also referred to as extended focus imaging (EFI)) of a specimen by using a plurality of pieces of image data with different focal points generated by sequentially allowing an imaging unit to image the specimen while moving a stage, on which the specimen is mounted, in the direction of an optical axis direction (Z-axis direction) of an objective lens by a focusing unit (for example, see Japanese Laid-open Patent Publication No. 2006-337470). With this technology, the imaging unit images a specimen, extracts and combines in-focus portions every time image data is generated, and generates an extended focus image.

SUMMARY

According to one aspect of the present disclosure, there is provided a microscope system for observing a specimen via an objective lens that forms an observation image of the specimen, the microscope system including: a stage on which the specimen is mounted; one or more light sources configured to emit light irradiating the specimen; an illumination optical system configured to irradiate the specimen with the light emitted from the light sources; an operating unit configured to receive selection of the light sources and setting of the state and/or an amount of light of each of the light sources; a focusing unit configured to move in a direction orthogonal to a mounting surface on which the specimen is mounted and adjust the distance between the stage and the objective lens; an imaging unit configured to image the observation image of the specimen formed by the objective lens and generate image data of the specimen; and a combined image generating unit configured to combine a plurality of pieces of the image data generated by the imaging unit and generate combined image data, wherein when the combined image generating unit generates the combined image data, the microscope system enables selection of the state of optical elements constituting the illumination optical system and selection of the type, the state, and an amount of light of the light source.

The above and other features, advantages and technical and industrial significance of this disclosure will be better understood by reading the following detailed description of presently preferred embodiments of the disclosure, when considered in connection with the accompanying drawings.

DETAILED DESCRIPTION

Figure 1:
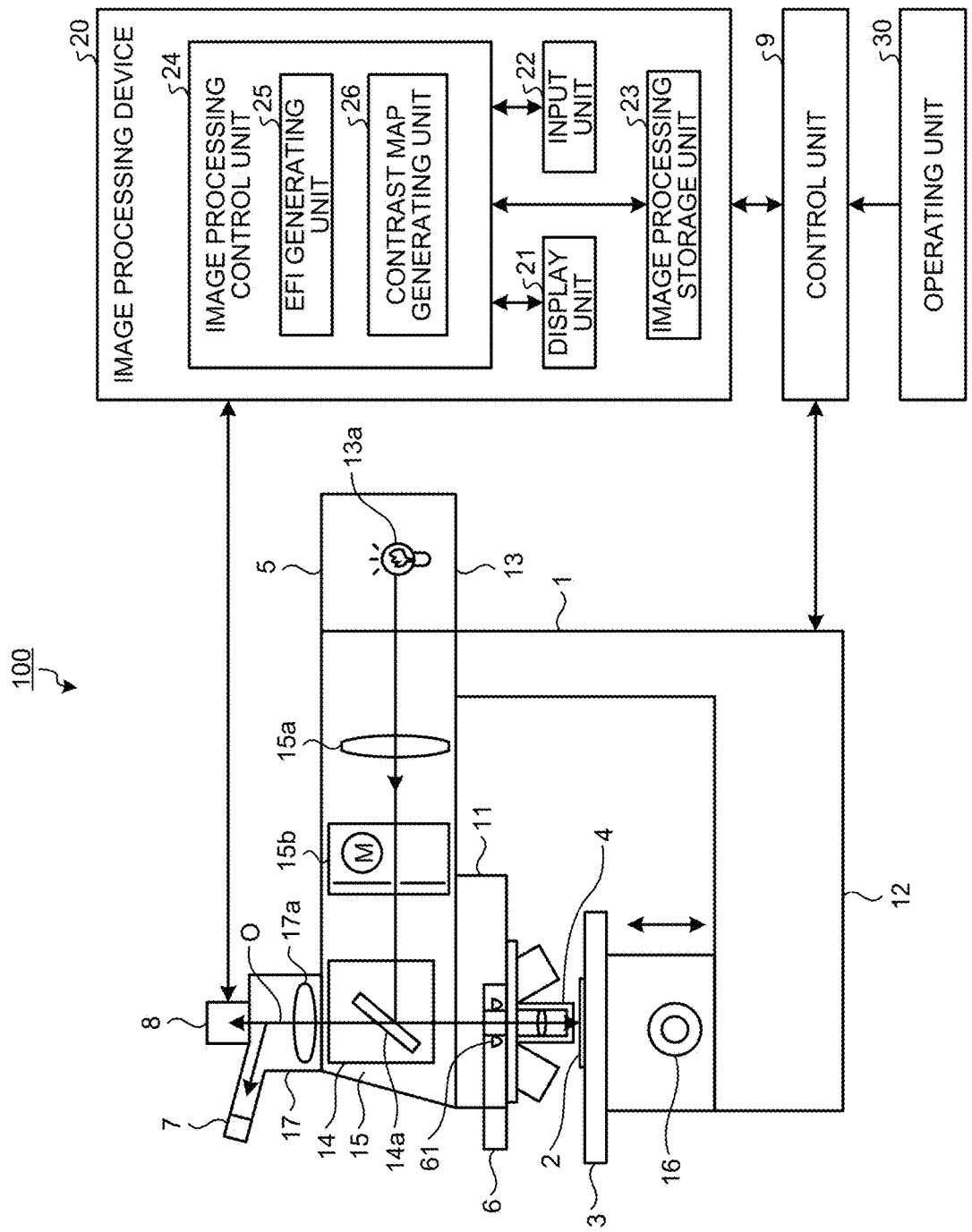
FIG. 1 is a schematic view illustrating, in outline, the configuration of a microscope system according to a first embodiment.

In the following, modes for carrying out the present disclosure (hereinafter, referred to as "embodiments") will be described with reference to drawings. The present disclosure is not limited to the embodiments described below. In the drawings used for the descriptions below, shapes, sizes, and positional relationships are only schematically illustrated so that the content may be understood. Namely, the present disclosure is not limited to only the shapes, the sizes, and the positional relationships illustrated in the drawings.

First Embodiment

FIG. 1 is a schematic view illustrating, in outline, the configuration of a microscope system according to a first embodiment. A microscope system 100 includes a microscope main body 1, a stage 3 on which a specimen 2 is mounted, objective lenses 4 arranged facing to the stage 3, a coaxial incident light source 5 that irradiates the specimen 2 with illumination light used for bright field (BF) illumination, a DF ring light source 6 that irradiates the specimen 2 with illumination light used for dark field (DF) illumination, an eyepiece 7 that observes light reflected from the specimen 2, an imaging device 8 that images the light reflected from the specimen 2, a control unit 9 that performs control of driving of the microscope system 100, an image processing device 20 that displays an image associated with image data generated by the imaging device 8 and that receives inputs of various operations performed in the microscope system 100, and an operating unit 30 that sets illumination light or the like that irradiates the specimen 2. The microscope main body 1, the imaging device 8, the control unit 9, the image processing device 20, and the operating unit 30 are connected in a wired or wireless manner such that data may be sent and received.

The microscope main body 1 has a microscope frame 12 that has a substantially C-shaped cross-section, that supports the stage 3, and that holds the objective lenses 4 via a revolver 11.

The stage 3 is formed so as to be freely movable in the XYZ-axis direction and moves in accordance with an operation of a stage operating unit (not illustrated).

The revolver 11 is arranged so as to be freely slidable or rotatable with respect to the microscope frame 12 and is arranged such that the objective lenses 4 are arranged above the specimen 2. The revolver 11 holds a plurality of the objective lenses 4 with different magnifying powers (observation magnifying powers).

The objective lenses 4 are attached to the revolver 11. By operating the focusing handle 16 arranged on the microscope frame 12, the stage 3 is moved in the optical path direction (Z-axis direction) and focusing is adjusted.

The coaxial incident light source 5 includes a lamphouse 13 having an epi-illumination light source 13a that irradiates illumination light used for bright field illumination and a light projection tube 15 that condenses the illumination light emitted by the epi-illumination light source 13a and that outputs the light to a mirror 14a inside a cube turret 14. In the light projection tube 15, at least a condenser lens 15a that condenses illumination light used for a bright field emitted by the epi-illumination light source 13a and an aperture stop 15b are arranged. The aperture stop 15b has a motor, such as a stepping motor or an ultrasonic motor; the motor is driven under the control of the control unit 9; and an aperture of the aperture stop 15b is adjusted. The illumination light used for the bright field emitted by the epi-illumination light source 13a irradiates the specimen 2 via the illumination optical system, such as the condenser lens 15a, the aperture stop 15b, the mirror 14a, and the objective lens 4. The reflected light from the specimen 2 is introduced into the eyepiece 7 or the imaging device 8 by the objective lens 4, the mirror 14a, a tube lens 17a in a trinocular tube 17, a splitting prism (not illustrated), and a mirror and then a visual observation or the like is performed.

Figure 2A:
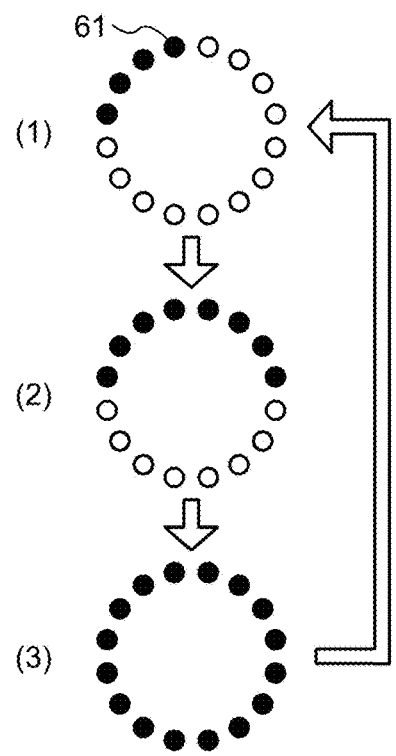
FIG. 2A is a diagram illustrating lighting portions of LED illumination at the time of changing lighting modes of a DF ring light source in the microscope system according to the first embodiment.

In the DF ring light source 6, a plurality of pieces of LED illumination 61 are arranged in a ring shape. Illumination light used for a dark field irradiated from the LED illumination 61 is substantially collimated light, passes through a dark field optical path arranged outside the optical path of the objective lens 4, and is irradiated onto the specimen 2. In the first embodiment, the DF ring light source 6 includes 16 pieces of the LED illumination 61, each of the pieces of the LED illumination 61 is divided into segments and is controlled by the control unit 9 such that the LED illumination 61 is turned on and turn off for each segment. FIG. 2A is a diagram illustrating the lighting portions of the LED illumination 61 at the time of changing lighting modes of the DF ring light source 6. In FIG. 2A, black dots indicate the lighting LED illumination 61 and white dots indicate the turned-off LED illumination 61.

The DF ring light source 6 has a mode in which the number of pieces of the LED illumination 61 corresponding to 90 degrees (4/16) are turned on (FIG. 2A (1)), a mode in which the number of pieces of the LED illumination 61 corresponding to 180 degrees (8/16) are turned on (FIG. 2A (2)), and a mode in which the number of pieces of the LED illumination 61 corresponding to 360 degrees (16/16) are turned on (FIG. 2A (3)). The lighting modes ((1) to (3) in FIG. 2A) may be changed by pressing a lighting mode selecting unit 32 (see FIG. 4), which will be described later, in the operating unit 30. By changing the lighting modes, it is possible to easily observe irregularities or the like of the specimen 2.

Figure 2B:
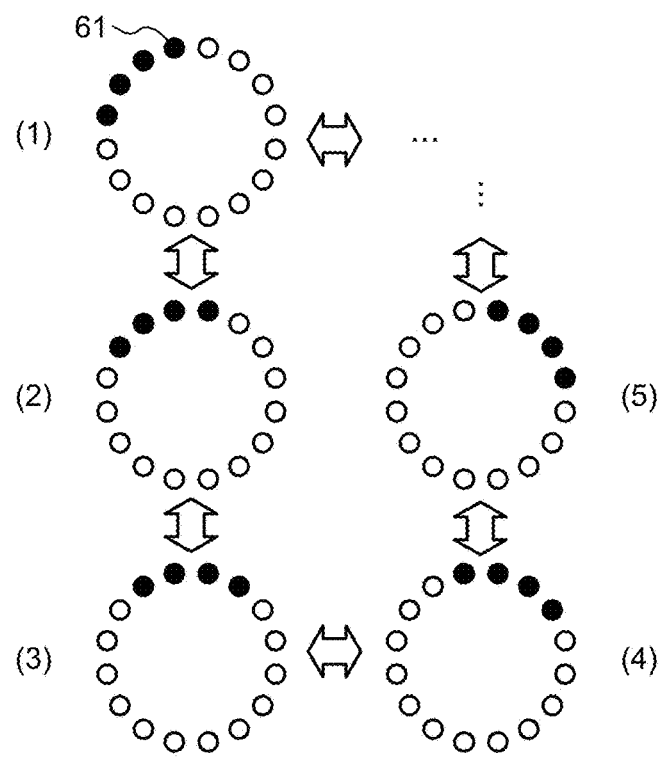
FIG. 2B is a diagram illustrating lighting portions of LED illumination at the time of rotation of a segment of the DF ring light source in the microscope system according to the first embodiment.

Furthermore, the DF ring light source 6 may rotate, without changing the lighting modes, the portions in which the LED illumination 61 is being turned on. FIG. 2B is a diagram illustrating lighting portions of the LED illumination 61 at the time of rotation of a segment of the DF ring light source 6. FIG. 2B indicates the lighting portions of the LED illumination 61 in the case where the lighting segments rotates in the state where the pattern (FIG. 2A (1)) in which four pieces of the LED illumination 61 are turned on is selected. As illustrated in FIG. 2B, when rotating a knob of a rotating operation unit 33 (see FIG. 4), which will be described later, in the operating unit 30 in the state where the upper left of four pieces of the LED illumination 61 arranged in a ring shape are turned on, the portions of the lighting LED illumination 61 rotates clockwise (CW) or counterclockwise (COW) by one piece (22.5 degrees). Due to rotation of the lighting LED illumination 61, it is easy to observe irregularities or the like of the specimen 2.

The imaging device 8 is formed by an image sensor, such as charge coupled device (CCD) or a complementary metal oxide semiconductor (CMOS), having a plurality of pixels obtained by receiving light of an observation image (observation light) of the specimen 2 incident via the objective lens 4, the tube lens 17a, and the like and converting the light to an electrical signal (analog signal) by performing photoelectric conversion, and a signal processing unit (not illustrated) that converts, after having performed signal processing, such as amplification (gain adjustment), on the electrical signal output from the image sensor, the processed signal to digital image data of the specimen 2 by performing A/D conversion and that outputs the image data to an EFI generating unit 25. The imaging device 8 continuously generates, under the control of the control unit 9, image data of the specimen 2 at small time intervals and then outputs the image data to the EFI generating unit 25. Furthermore, the imaging device 8 generates the image data at a predetermined frame rate, for example, 15 fps. Furthermore, in the first embodiment, the imaging device 8 functions as an imaging unit.

Figure 3:
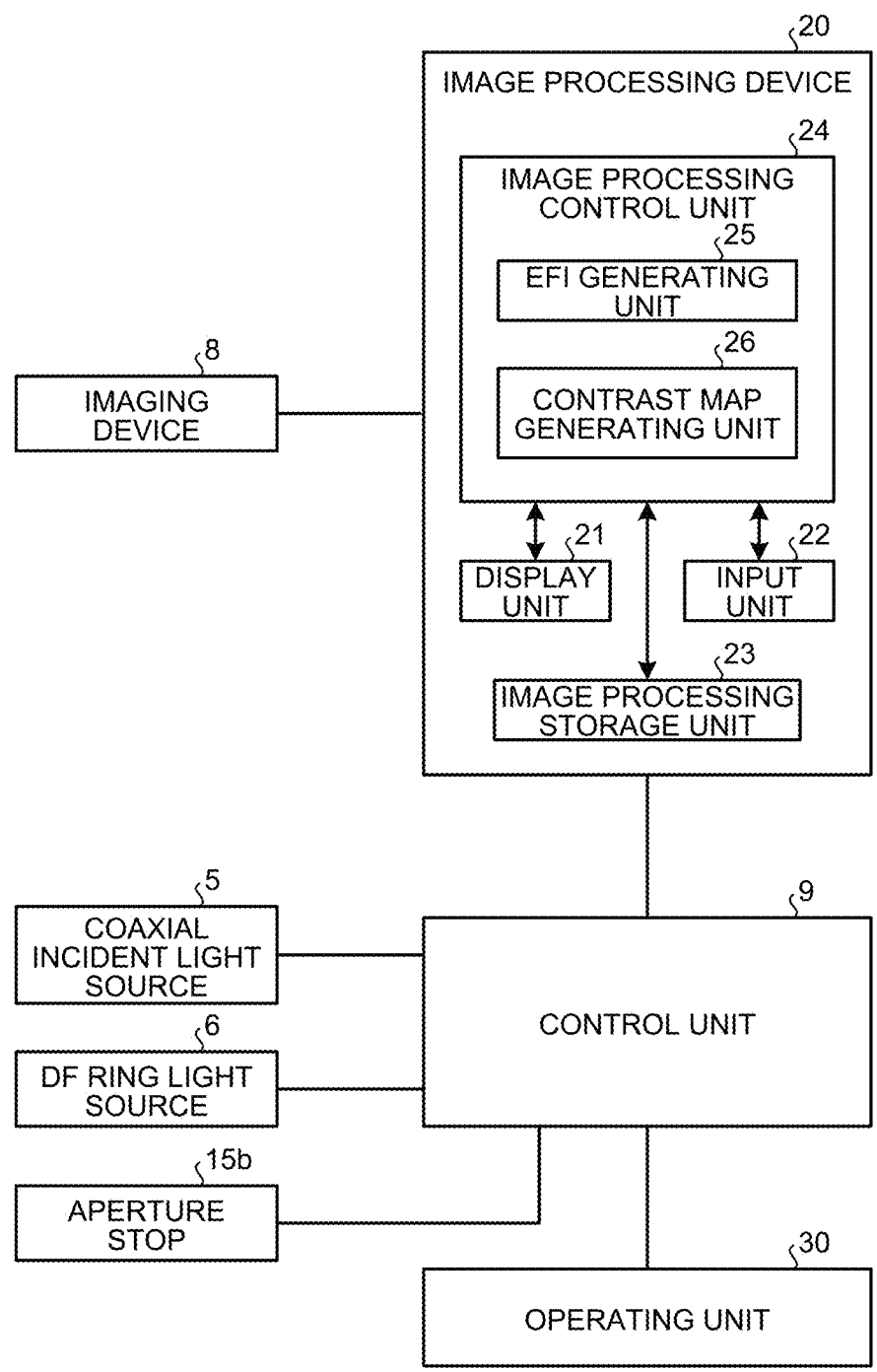
FIG. 3 is a block diagram illustrating the configuration of a communication system in the microscope system according to the first embodiment.

The control unit 9 performs control of driving of the microscope system 100. FIG. 3 is a block diagram illustrating the configuration of a communication system in the microscope system 100 illustrated in FIG. 1. The control unit 9 controls, in accordance with a command received via the operating unit 30, illumination of the illumination light of the coaxial incident light source 5 and the DF ring light source 6. Furthermore, the control unit 9 controls the aperture of the aperture stop 15b in accordance with a command received via the operating unit 30.

The image processing device 20 is formed by using a personal computer and generates an extended focus image based on a plurality of pieces of image data generated by the imaging device 8. The image processing device 20 includes a display unit 21 that displays an image associated with the image data generated by the imaging device 8, an input unit 22 that receives an input of an instruction signal for instructing various operations related to the microscope system 100, an image processing storage unit 23 that records various kinds of programs or information executed by the image processing device 20, and an image processing control unit 24 that controls each of the units in the image processing device 20. The image processing device 20 controls the imaging device 8, acquires the image data generated by the imaging device 8, and displays the acquired image data on the display unit 21.

The display unit 21 is formed by using a display panel, such as a liquid crystal panel or an organic electro luminescence (EL) display panel. The display unit 21 displays an image associated with the image data generated by the imaging device 8.

The input unit 22 is formed by using an input device, such as a keyboard and a mouse, and outputs operation signals associated with the operation inputs of various input devices to the image processing device 20.

The image processing storage unit 23 is formed by using a synchronous dynamic random access memory (SDRAM), a flash memory, or the like and records various programs, data that is being processed, and image data generated by the imaging device 8 executed by the image processing device 20. Furthermore, the image processing storage unit 23 may also be formed by using a memory card that is freely insertable and removable from outside.

The image processing control unit 24 is formed by using a central processing unit (CPU) or the like. By controlling each of the units in the image processing device 20, the image processing control unit 24 performs overall control of the operation of the image processing device 20. The image processing control unit 24 includes the EFI generating unit 25 that calculates a contrast value of image data for each pixel, that extracts and combines the pixels having high contrast values, and generates an extended focus image and a contrast map generating unit 26 that generates a combined contrast map by combining the image data generated by the imaging device 8 having a luminance value with the highest contrast value for each pixel.

Figure 4:
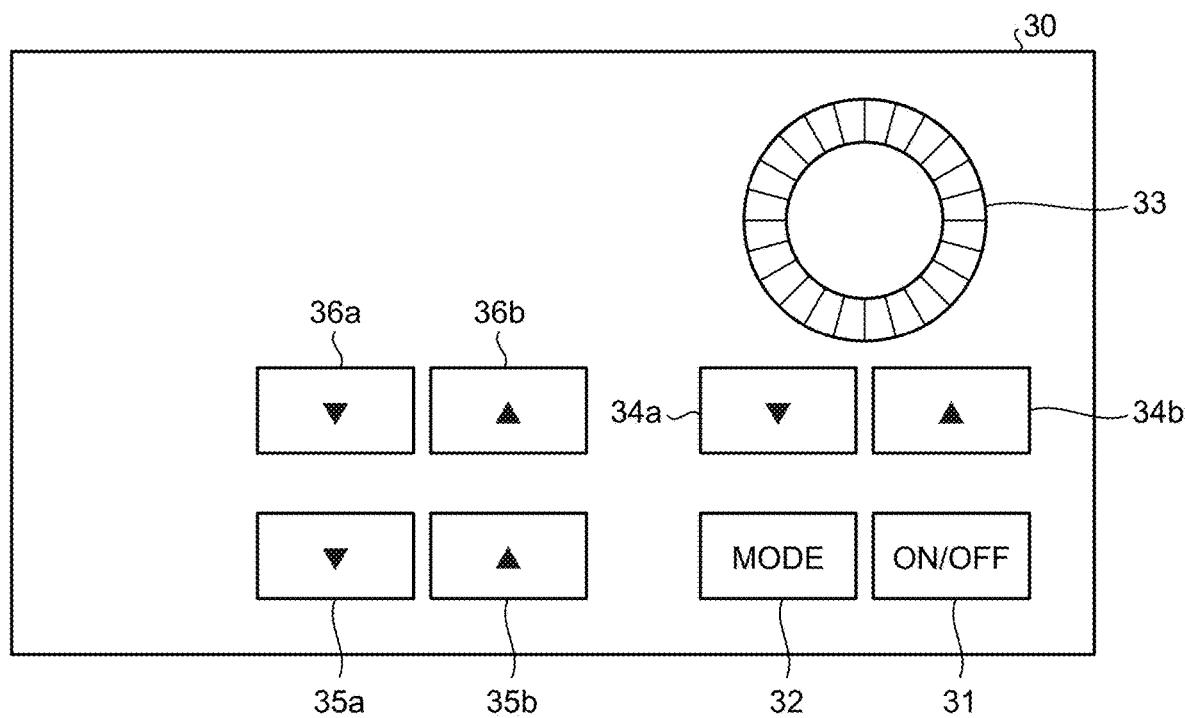
FIG. 4 is a diagram illustrating an example of an operating unit in the microscope system according to the first embodiment.

The operating unit 30 includes, as illustrated in FIG. 4, an ON/OFF switch 31 that turns on and off all of the pieces of the LED illumination 61 of the DF ring light source 6; the lighting mode selecting unit 32 that selects a lighting mode of the OF ring light source 6, for example, as illustrated in FIG. 2A, the lighting mode by 90 degrees, the lighting mode by 180 degrees, and the lighting mode by 360 degrees; the rotating operation unit 33 that rotates the lighting portions of the LED illumination 61 while maintaining the lighting mode of the DF ring light source 6; DF light source light-level operating units 34a and 34b that increase and decrease an amount of light of the DF ring light source 6; coaxial light source light-level operating units 35a and 35b that increase and decrease an amount of light of the coaxial incident light source 5; and AS operating units 36a and 36b that adjust the aperture of the aperture stop 15b. An observer inputs, via each of the operating units in the operating unit 30, an instruction about an amount of light of the coaxial incident light source 5 and the DF ring light source 6, selection of the lighting mode of the DF ring light source 6, rotation, and the aperture of the aperture stop 15b.

In the following, generating an extended focus image will be described with reference to FIG. 5. FIG. 5A to FIG. 5C are diagrams each illustrating an example of an EFI generating screen displayed on the display unit in the microscope system according to the first embodiment.

Figure 5A:
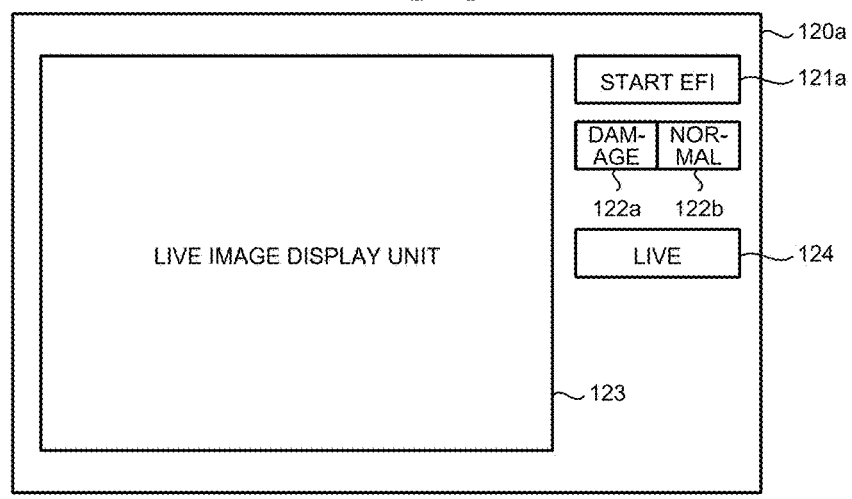
FIG. 5A is a diagram illustrating an example of an EFI generating screen displayed on a display unit in the microscope system according to the first embodiment.

The display unit 21 displays an EFI generating screen 120a illustrated in FIG. 5A. The EFI generating screen 120a includes an EFI start button 121a that receives an input of a start signal for instructing to start an EFI generation; a damage mode button 122a that receives a signal for instructing to select a damage mode at the time of EFI generation; a normal mode button 122b that receives a signal for instructing to select a normal mode at the time of EFI generation; a live image display unit 123 that displays a live image of the specimen 2 imaged by the imaging device 8, and a live image button 124 that receives an input of a signal for instructing to select the start/stop of displaying the live image on the live image display unit 123.

The damage mode at the time of EFI generation is a mode that is used when generating an extended focus image of the specimen 2 having irregularities on its surface or the specimen 2 having a large or sharp difference in thickness of the surface thereof and the normal mode is a mode that is used when generating an extended focus image on the specimen 2 having a relative smooth surface other than those described above. An observer may generate the extended focus image by selecting, in accordance with the specimen 2, the damage mode or the normal mode by using the damage mode button 122a or the normal mode button 122b, respectively.

Figure 5B:
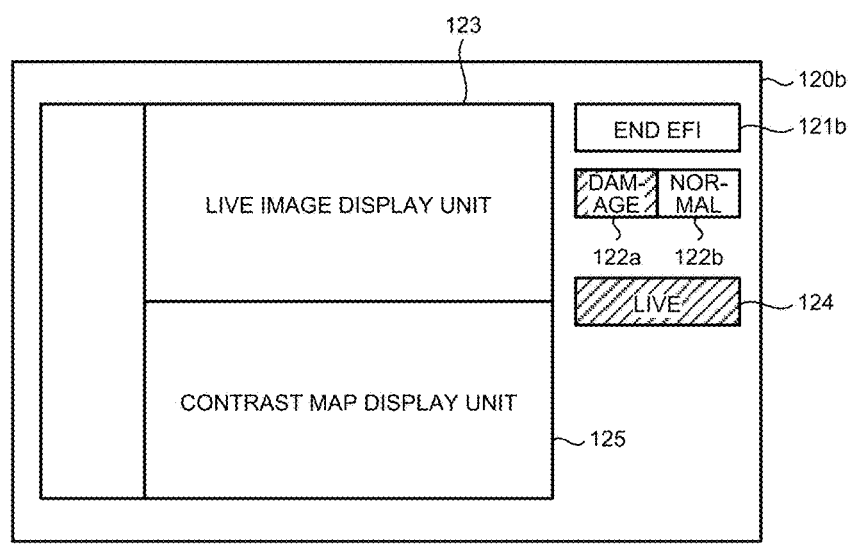
FIG. 5B is a diagram illustrating an example of the EFI generating screen displayed on the display unit in the microscope system according to the first embodiment.
Figure 5C:
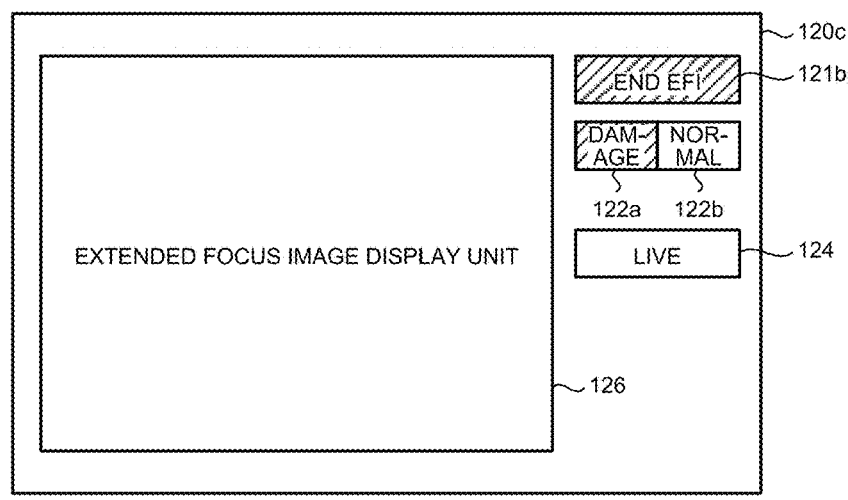
FIG. 5C is a diagram illustrating an example of the EFI generating screen displayed on the display unit in the microscope system according to the first embodiment.

When an input of the start signal for instructing to start generating an EFI is received by the EFI start button 121a and the EFI mode is selected by the damage mode button 122a or the normal mode button 122b, the display unit 21 displays an EFI generating screen 120b indicated by FIG. 5B. The EFI generating screen 120b includes an EFI end button 121b that receives an input of an end signal for instructing to end the EFI generation, a damage mode button 122a, a normal mode button 122b, a live image display unit 123 that displays the live image of the specimen 2 imaged by the imaging device 8, a live image button 124, and a contrast map display unit 125 that displays a contrast map related to the stored extended focus image data. The EFI generating screen 120b indicates the screen in which the normal mode is selected by the normal mode button 122b and is configured such that an operating unit (damage mode button 122a and the live image button 124) whose operation is set to invalid on the EFI generating screen 120b may be visually identified (hatching or the like).

The EFI generating unit 25 extracts the image data that is imaged and generated by the imaging device 8, i.e., a focused portion in the image displayed on the live image display unit 123, and generates an extended focus image. The contrast map is obtained by performing luminance conversion on a contrast value for each pixel regarding the extended focus image generated by the EFI generating unit 25 obtained by combining the images that are imaged by the imaging device 8 and that have a luminance value with the highest contrast value for each pixel of the generated image data and indicates the in focus state as the screen is brighter (luminance is high), whereas the out of focus state as the screen is darker (luminance is low). An observer may adjust the optical path direction (Z-axis direction) of the specimen 2 mounted on the stage 3 by operating the focusing handle 16 and determine, while viewing the newly generated image data and the contrast map, the in focus portion and the out of focus portion of the extended focus image.

If the observer determines, based on the contrast map displayed on the contrast map display unit 125, that a desired extended focus image has been generated, the observer inputs an instruction to end the EFI by the EFI end button 121b on the EFI generating screen 120b illustrated in FIG. 5B. When the instruction to end the EFI is input, an EFI generating screen 120c illustrated in FIG. 5C is displayed on the display unit 21. The EFI generating screen 120c includes an extended focus image display unit 126 that displays an extended focus image. After having checked the extended focus image displayed on the extended focus image display unit 126, by selecting and instructing the live image button 124, the EFI generating screen 120a indicated by FIG. 5A is again displayed on the display unit 21; therefore, the observer may newly generate an extended focus image of the specimen 2

Figure 6:
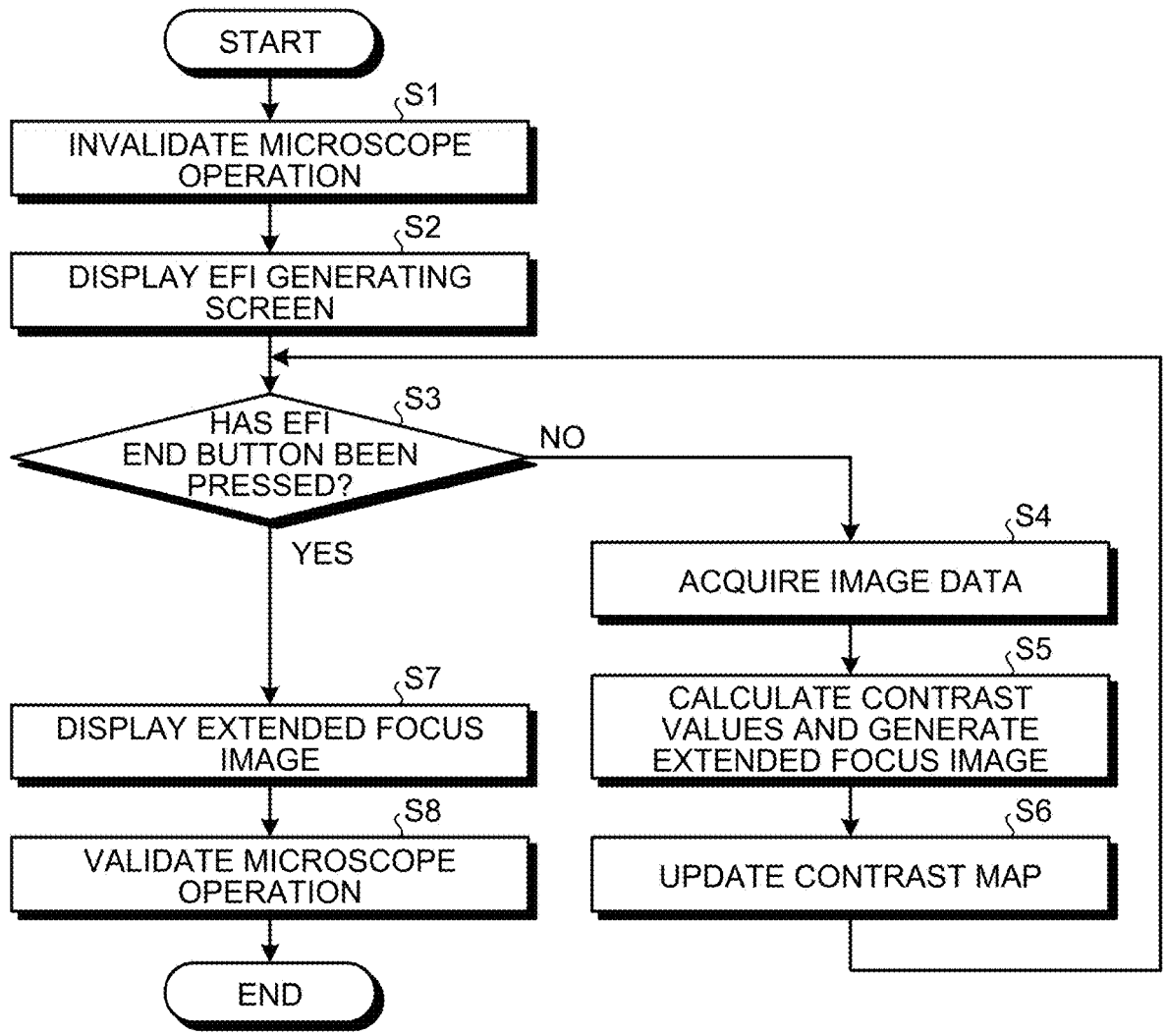
FIG. 6 is a flowchart at the time of generating an EFI in a normal mode by the microscope system according to the first embodiment.

When an input of the start signal to instruct to start generating the EFI is received by the EFI start button 121a and the normal mode is selected by the normal mode button 122b, an extended focus image is generated based on the flowchart illustrated in FIG. 6.

In the normal mode, first, it is determined that, by the control unit 9, the operation of each of the units in a microscope main body 1 is set to invalid, i.e., the observation condition of the microscope is not able to be changed (Step S1), and the EFI generating screen 120b is displayed on the display unit 21 (Step S2). The EFI generating unit 25 determines whether the EFI end button 121b has been pressed (Step S3) and, if the EFI end button 121b is not pressed (No at Step S3), image data is acquired by the imaging device 8 (Step S4), and the EFI generating unit 25 calculates a contrast value for each pixel of the acquired image data, extracts the pixel indicating the contrast value that is higher than that of the previous extended focus image, and generates an extended focus image (Step S5).

If the EFI generating unit 25 generates an extended focus image, the contrast map generating unit 26 generates and updates the contrast map in which luminance conversion is performed on the contrast value of the generated extended focus image (Step S6). If the EFI generating unit 25 determines that the EFI end button 121b is not pressed (No at Step S3), processes at Step S4 to Step S6, i.e., the processes of acquiring image data, generating an extended focus image, and updating a contrast map are repeated.

If the EFI generating unit 25 determines that the EFI end button 121b has been pressed (Yes at Step S3), the EFI generating screen 120c is displayed on the display unit 21 and the extended focus image display unit 126 displays the extended focus image that was generated immediately before (Step S7). The control unit 9 sets the operation of the microscope main body 1 to valid (Step S8), and EFI generation is ended.

Figure 7:
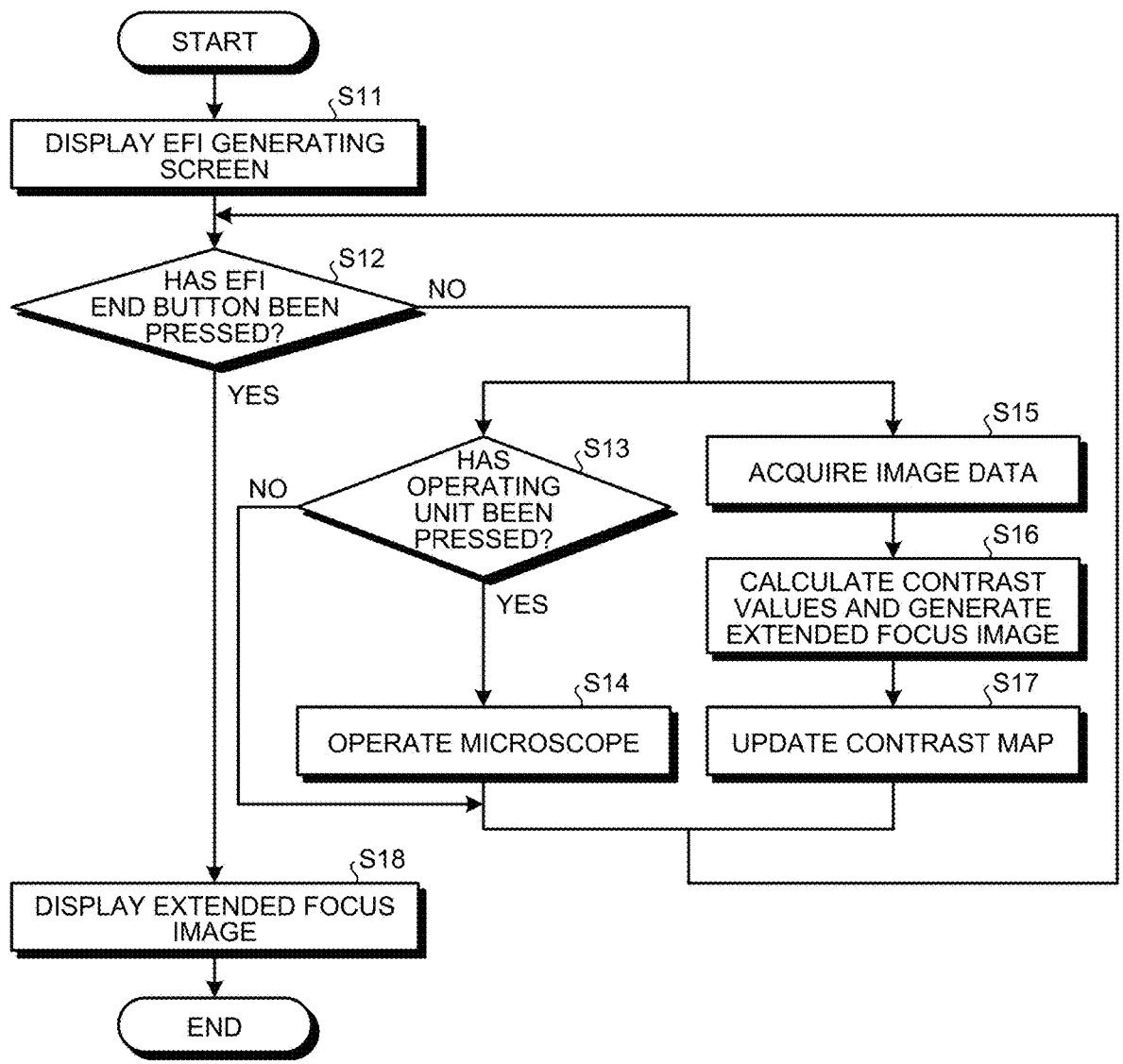
FIG. 7 is a flowchart at the time of generating the EFI in a damage mode by the microscope system according to the first embodiment.

In contrast, if an input of the start signal for instructing to start EFI generation is received by the EFI start button 121a and the damage mode is selected by the damage mode button 122a, an extended focus image is generated based on the flowchart illustrated in FIG. 7.

In the damage mode, the EFI generating screen 120b is displayed on the display unit 21 (Step S11), and the EFI generating unit 25 determines whether the EFI end button 121b has been pressed (Step S12). If it is determined that the EFI end button is not pressed (No at Step S12), the operation of the microscope main body 1 performed by the operating unit 30, i.e., changing of the observation condition of the microscope and generating an extended focus image and a contrast map are performed in parallel.

The control unit 9 determines whether various selecting units in the operating unit 30 have been pressed (Step S13) and, if the control unit 9 determines that the operating unit 30 has been operated (Yes at Step S13), the control unit 9 operates the light source or the like of the microscope based on the instruction received by the operating unit 30 (Step S14). If it is determined that the operating unit 30 is not operated (No at Step S13), the process is repeated from Step S12. In the damage mode, if an observer determines that, based on the contrast map, a low contrast portion is present in the extended focus image, it is possible to generate an extended focus image with good contrast by simultaneously irradiating, by the operating unit 30, the specimen 2 with the light source of the microscope, for example, the coaxial incident light source 5 and the DF ring light source 6 or by changing the observation condition of the microscope, such as selecting the lighting mode of the DF ring light source 6.

In parallel with the operation of the microscope, the imaging device 8 acquires the image data (Step S15) and the EFI generating unit 25 calculates a contrast value of the image data and generates an extended focus image (Step S16). The contrast map generating unit 26 generates a contrast map from the extended focus image and updates the contrast map (Step S17).

When the EFI generating unit 25 determines that the EFI end button 121b has been pressed (Yes at Step S12), the EFI generating screen 120c is displayed on the display unit 21 and the extended focus image display unit 126 displays the extended focus image that was generated immediately before (Step S18) and ends EFI generation.

Figure 8:
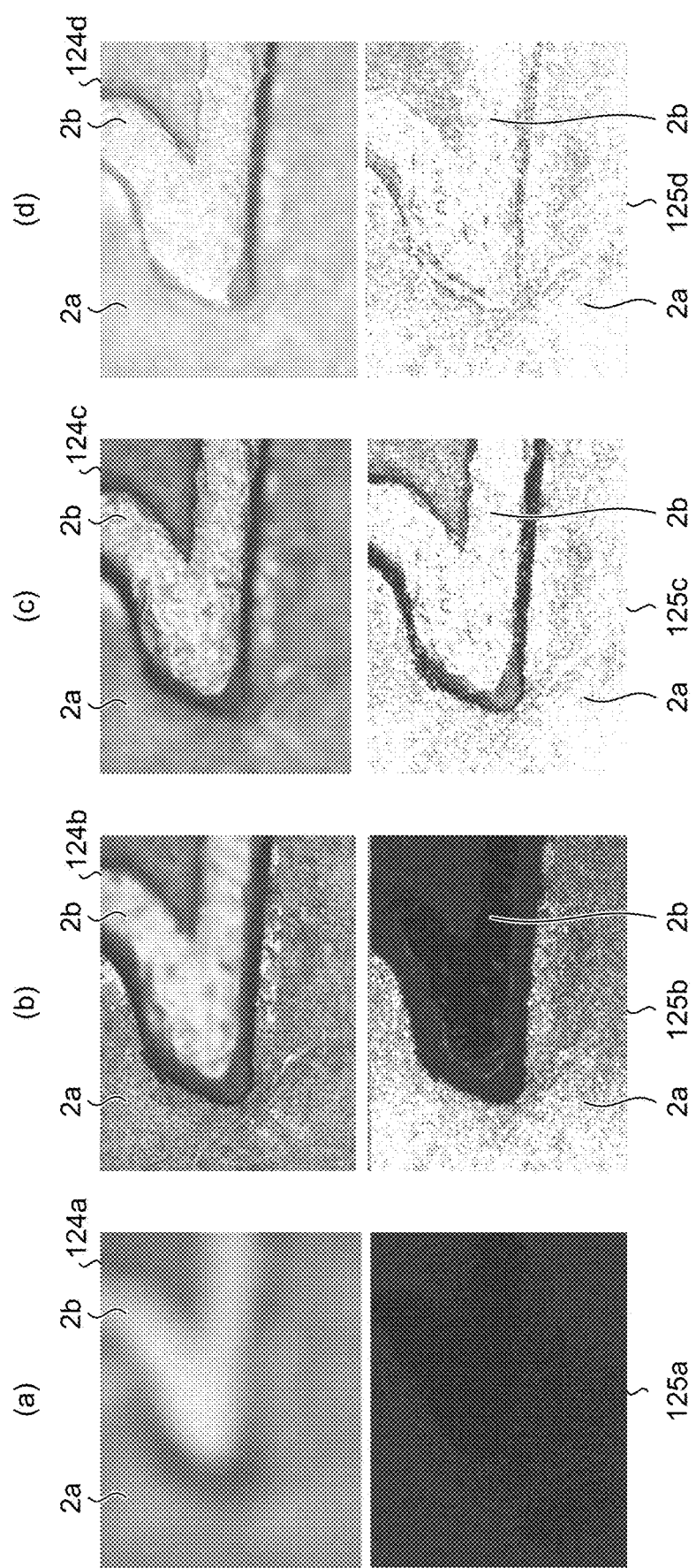
FIG. 8 is diagrams for explaining generation of EFIs based on live images and contrast maps displayed on the display unit.

FIG. 8 is diagrams for explaining generation of an EFI based on live images and contrast maps displayed on the display unit 21. FIG. 8 (*a*) indicates the live image and the contrast map at the time of starting of EFI generation, FIG. 8 (*b*) indicates the state in which a lower surface 2a of the specimen 2 is in focus, FIG. 8 (*c*) indicates the state in which an upper surface 2b of the specimen 2 is in focus, FIG. 8 (*d*) indicates the live image and the contrast map obtained in the state in which both the coaxial incident light source 5 and the DF ring light source 6 simultaneously irradiate the specimen 2. Furthermore, the contrast maps in FIG. 8 (*a*) to FIG. 8 (*d*) are generated from the extended focus image obtained by combining the live images in FIG. 8 (*a*) to FIG. 8 (*d*) over time.

A live image 124a at the time of start of EFI generation indicated in FIG. 8 (*a*) is out of focus regarding the specimen 2. Accordingly, the entire of a contrast map 125a of the extended focus image generated from the live image 124a are indicated by black, which makes it possible to confirm that the entire of the extended focus image is out of focus.

FIG. 8 (*b*) indicates the state in which the lower surface 2a of the specimen 2 is in focus due to lowering the stage 3 by an observer. Regarding a contrast map 125b of the extended focus image generated from this live image 124b, the lower surface 2a is indicated in white, which makes it possible to identify that the lower surface 2a of the extended focus image is in focus.

FIG. 8 (*c*) indicates the state in which the observer further lowers the stage 3 and thus the upper surface 2b of the specimen 2 is in focus. Regarding a contrast map 125c of the extended focus image obtained by combining a live image 124c, the lower surface 2a and the upper surface 2b are indicated in white, which makes it possible to confirm that the lower surface 2a and the upper surface 2b of the combined image data are in focus.

FIG. 8 (*a*) to FIG. 8 (*c*) are obtained by observing by using only the coaxial incident light source 5 and it is possible to generate the extended focus image in which the lower surface 2a and the upper surface 2b of the specimen 2 are in focus. However, because a difference in thickness is present between the lower surface 2a and the upper surface 2b of the specimen 2 and this difference in thickness is large (or sharp), the portion of the difference in thickness is out of focus. In the first embodiment, the image data of the specimen 2 is acquired by the imaging device 8 while irradiating the specimen 2 with illumination light from all directions by the DF ring light source 6 in addition to the coaxial incident light source 5 and an extended focus image is generated based on this image data.

FIG. 8 (*d*) is image data of the specimen 2 imaged by focusing on the upper surface 2b of the specimen 2 and simultaneously irradiating the specimen 2 with the coaxial incident light source 5 and the DF ring light source 6. Regarding a contrast map 125d of the extended focus image generated from a live image 124d, the entire of the specimen 2 is indicated in white and it may confirm that the acquired entire extended focus image is in focus. By using the lighting mode selecting unit 32, the rotating operation unit 33, and the like in the operating unit 30, the observer acquires the image data by changing the illumination direction of the illumination light emitted from the DF ring light source 6 and generates an extended focus image. Because the observer may change, at the time of EFI generation, the observation condition by operating the operating unit 30 while viewing the contrast map displayed on the contrast map display unit 125, the observer may also simply and certainly generate the extended focus image in which the contrast of the specimen 2 is reflected even for the specimen 2 having small irregularities on its surface or the specimen 2 having a large difference in thickness of the surface thereof or a sharp difference in thickness.

Figure 9:
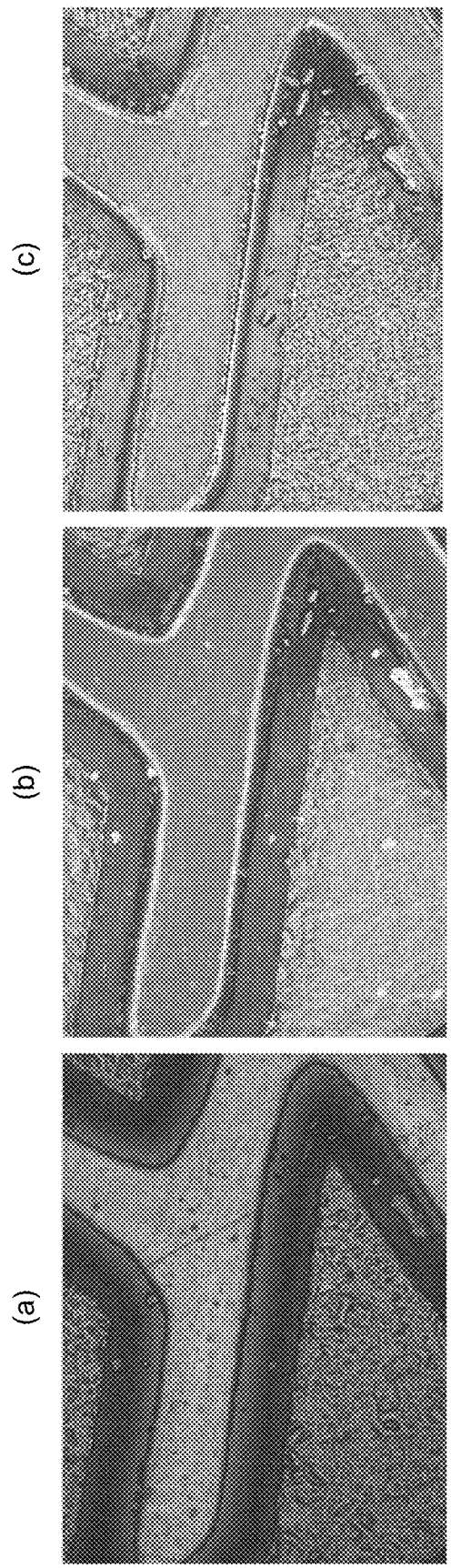
FIG. 9 is EFIs generated by changing a light source regarding the same specimen.

FIG. 9 is an extended focus image generated by changing the light source regarding the same specimen 2. FIG. 9 (*a*) is the extended focus image generated by irradiating the specimen 2 with only the coaxial incident light source 5, FIG. 9 (*b*) is the extended focus image generated by irradiating the specimen 2 with the LED illumination 61 of the coaxial incident light source 5 and the DF ring light source 6 by turning on all of the pieces of the LED illumination 61, FIG. 9 (*c*) is the extended focus image generated by irradiating the specimen 2 by rotating the LED illumination 61 lighting in the mode (FIG. 2A (1)) in which the coaxial incident light source 5 and the DF ring light source 6 are lighting by 90 degrees. The contrast indicated in FIG. 9 (*b*) and FIG. 9 (*c*) is higher than that indicated in FIG. 9 (*a*) and small irregularities on its surface is more clearly confirmed.

In the first embodiment described above, because an EFI may be generated while viewing the contrast map, it is possible to obtain the extended focus image in which the contrast of the specimen 2 is reflected. Furthermore, at the time of EFI generation, it is possible for an observer to generate the EFI in accordance with the specimen 2 by appropriately selecting the damage mode in which an operation instruction of the microscope is received, i.e., an observation condition may be changed, or the normal mode in which an operation instruction of the microscope is not received, i.e., an observation condition is not able to be changed.

Furthermore, in the damage mode in the first embodiment, the aperture of the aperture stop 15b may be operated by the AS operating units 36a and 36b; however, because an optimum position of the aperture of the aperture stop 15b is determined based on the pupil diameter of the objective lens 4 to be used, when the damage mode is selected, the control unit 9 may also be configured such that the control unit 9 automatically controls the aperture of the aperture stop 15b so as to be 60% to 80% of the pupil diameter of the objective lens 4.

Figure 10:
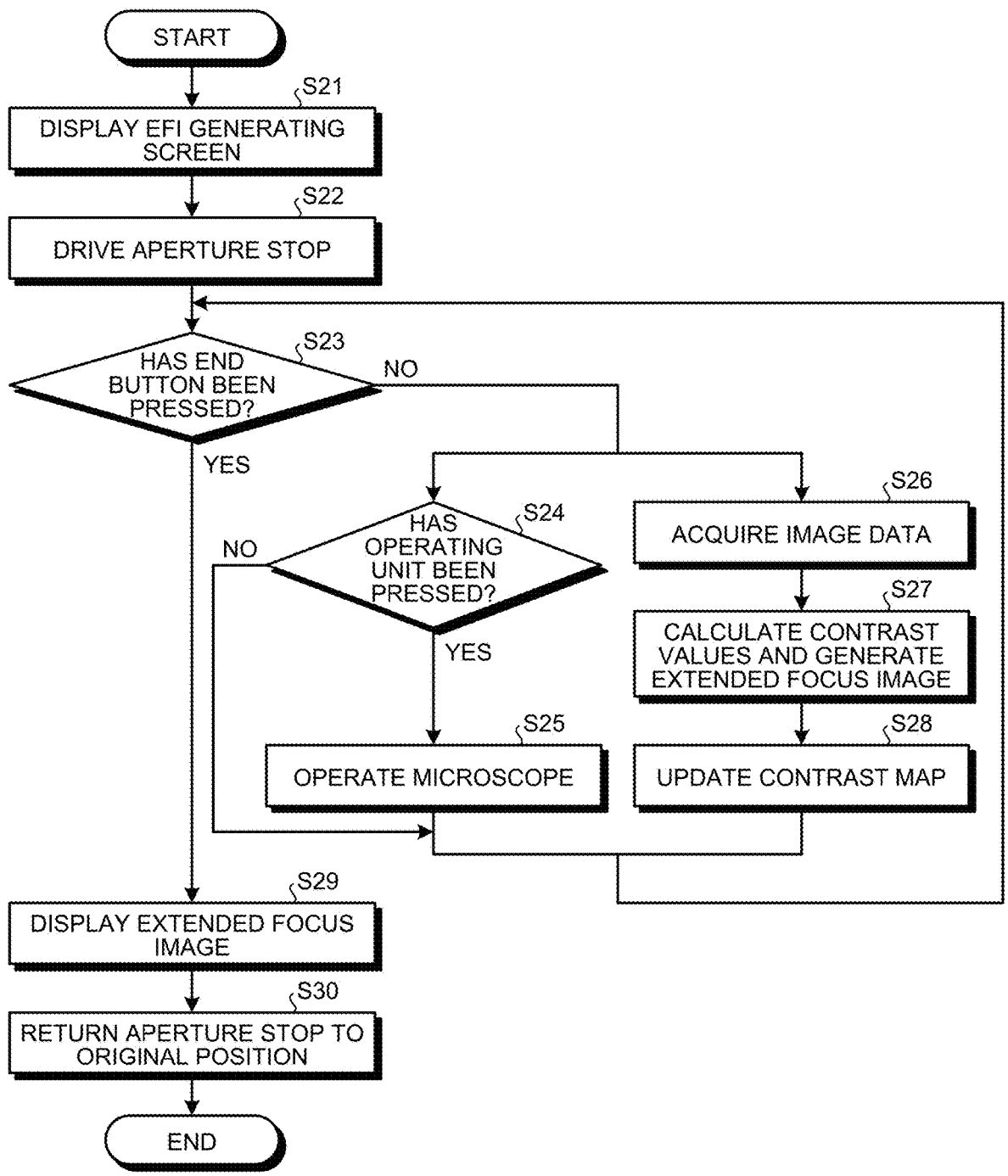
FIG. 10 is a flowchart in a case where EFI according to a modification of the first embodiment is generated.

FIG. 10 is a flowchart of EFI generation according to a first modification of the first embodiment. When an input of the start signal for instructing to start EFI generation is received by the EFI start button 121a and the damage mode is selected by the damage mode button 122a, the EFI generating screen 120b is displayed on the display unit 21 (Step S21) and the control unit 9 drives the motor of the aperture stop 15b and performs control such that the aperture is set to be 60% to 80% of the pupil diameter of the objective lens 4 (Step S22). Then, after having performed processes at Step S23 to Step S29 in the same manner as that performed at Step S12 to Step S18 illustrated in FIG. 7, the control unit 9 drives the motor of the aperture stop 15b and performs control such that the aperture returns to the original position (Step S30). Furthermore, in also the normal mode, an EFI may also be generated after the control unit 9 automatically controls the aperture of the aperture stop 15b so as to be set to 60% to 80% of the pupil diameter of the objective lens 4.

Furthermore, in the damage mode in the first embodiment, the operation of the microscope performed by the operating unit 30 may be set such that an operation of the DF ring light source 6 by which an observation of at least irregularities is possible and, for example, it is possible to set the operation of an amount of light of the coaxial incident light source 5 to invalid.

Second Embodiment

Figure 11:
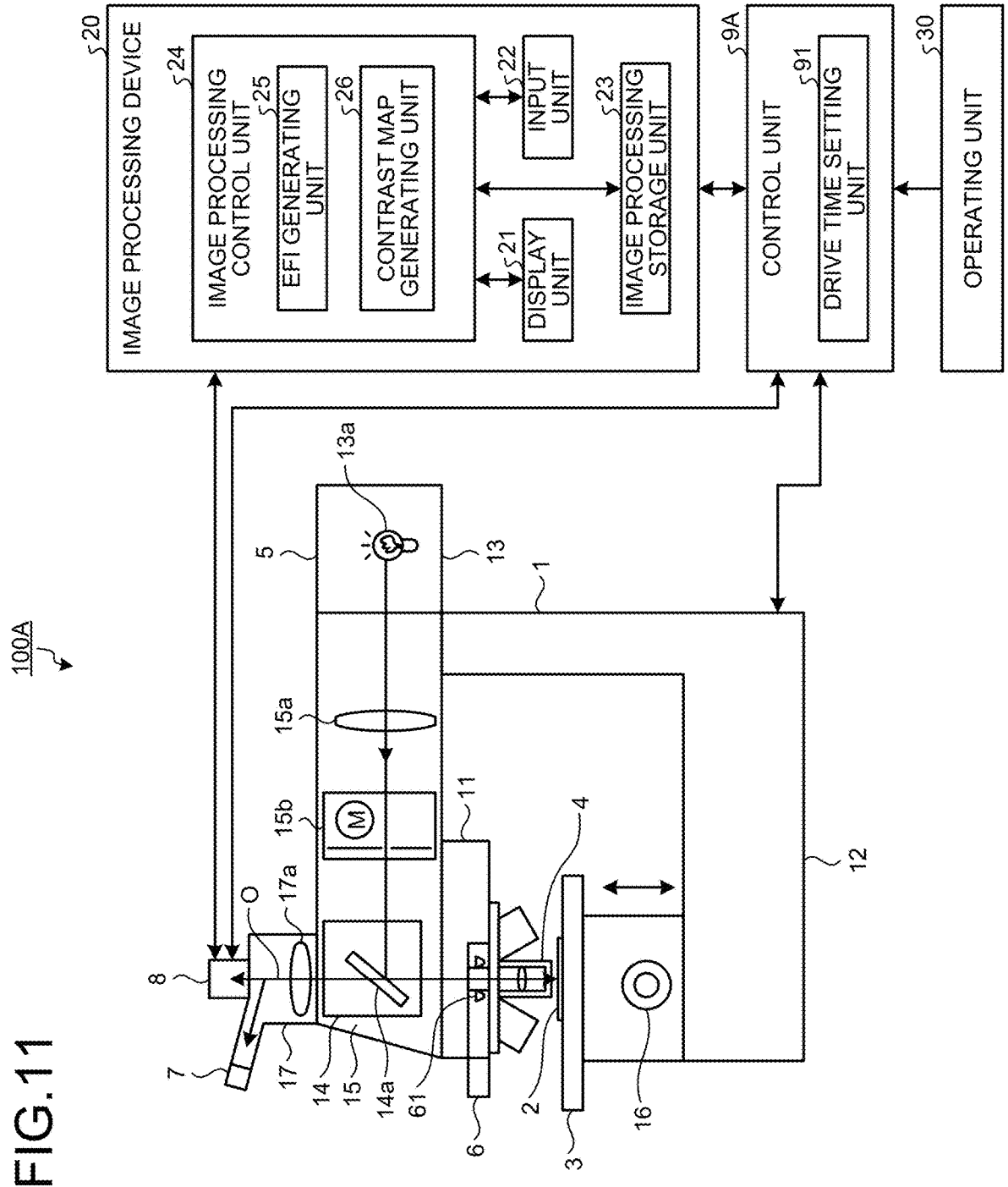
FIG. 11 is a schematic view illustrating, in outline, the configuration of a microscope system according to a second embodiment.
Figure 12:
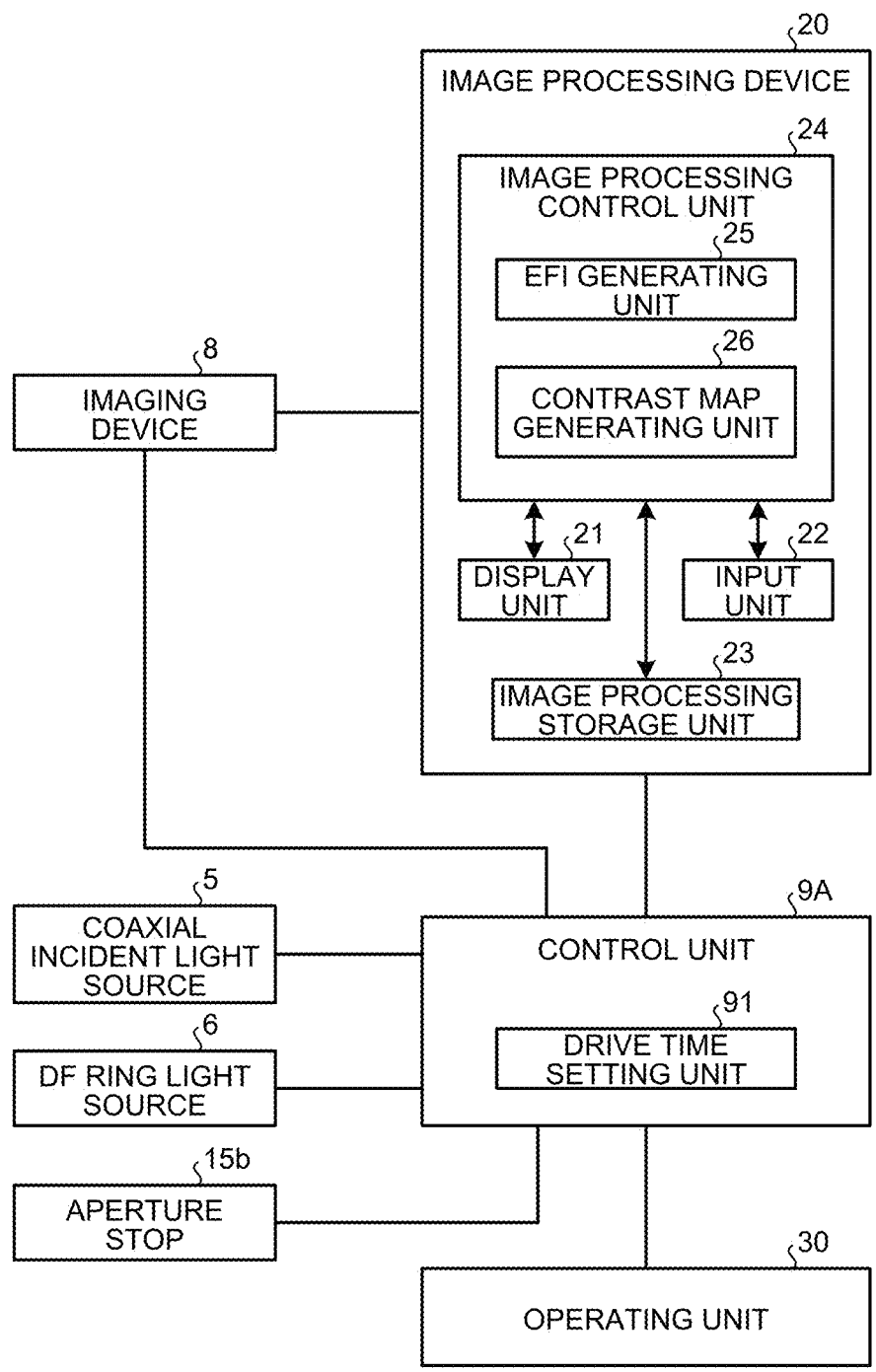
FIG. 12 is a block diagram illustrating the configuration of a communication system in the microscope system according to the second embodiment.
Figure 13:
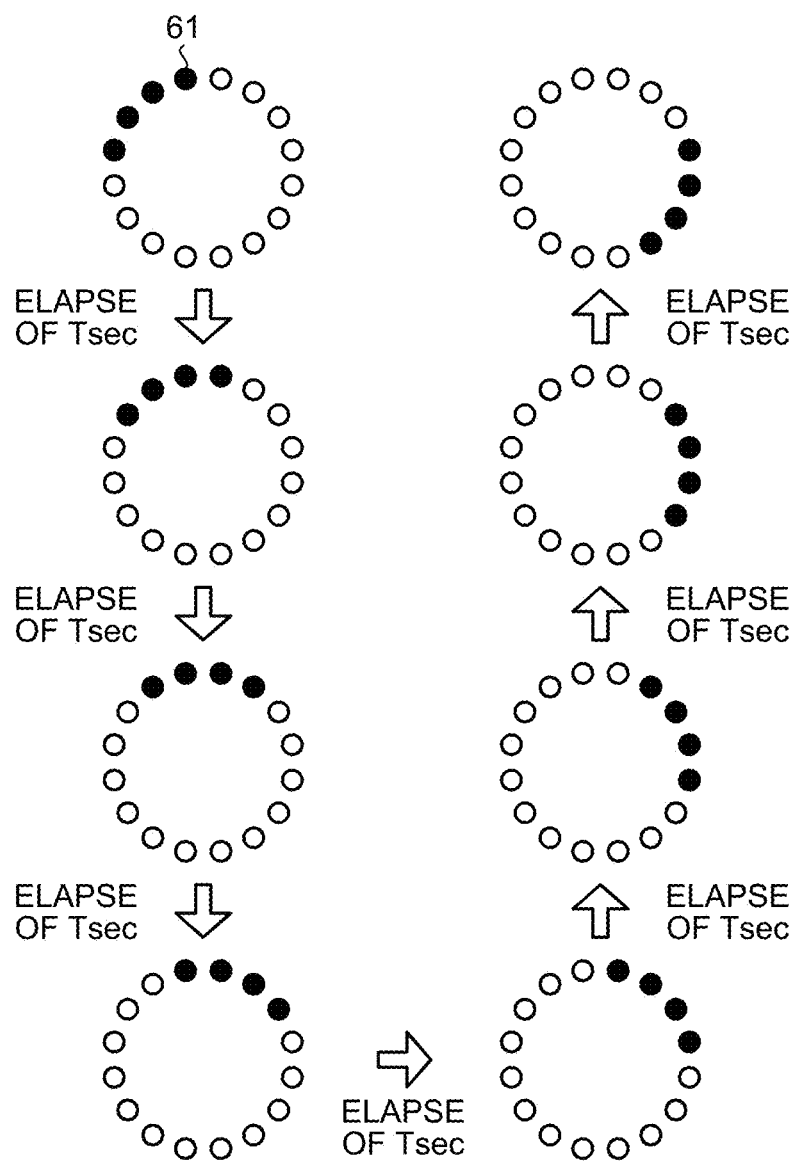
FIG. 13 is a diagram illustrating autorotation of lighting portions of LED illumination of the DF ring light source according to the microscope system in the second embodiment.

In a microscope system 100A according to a second embodiment, when an extended focus image is generated, the imaging device 8 images an image while automatically changing the segment of the lighting DF ring light source 6 and generates image data. FIG. 11 is a schematic view illustrating, in outline, the configuration of a microscope system according to the second embodiment. FIG. 12 is a block diagram illustrating the configuration of a communication system in the microscope system according to the second embodiment. FIG. 13 is a diagram illustrating autorotation of lighting portions of the LED illumination of the DF ring light source according to the microscope system in the second embodiment.

In the microscope system 100A, a control unit 9A includes a drive time setting unit 91 that determines lighting time T of the DF ring light source 6 based on the exposure time of the imaging device 8 and the transfer time of the image data. The control unit 9A determines or acquires the exposure time of the imaging device 8 and acquires the transfer time of the image data from the imaging device 8. The drive time setting unit 91 determines the lighting time T of the DF ring light source 6 based on the sum of the time needed for the imaging device 8 to image the specimen 2, i.e., the exposure time, and the time needed to transfer the image data. The lighting time T of the DF ring light source 6 may be set such that lighting is performed in a period of time from the start of exposure of the imaging device 8 to the end of the transfer of the image data and, if the transfer of the image data is started before the completion of exposure, the lighting time T may also be set so as to be smaller than the sum of the exposure time and the transfer time.

When the control unit 9A receives an instruction of EFI generation, as illustrated in FIG. 13, the control unit 9A allows the lighting segment of the LED illumination 61, which is lighting in 90-degree lighting mode, of the DF ring light source 6 to automatically rotate clockwise at intervals of T seconds. Furthermore, the control unit 9A performs control such that the rotation of the lighting segment and imaging in the imaging device 8 are synchronized. In the second embodiment, because the oblique-incidence direction of the DF ring light source 6 may automatically be changed, it is possible to easily obtain an extended focus image with high contrast.

Figure 14A:
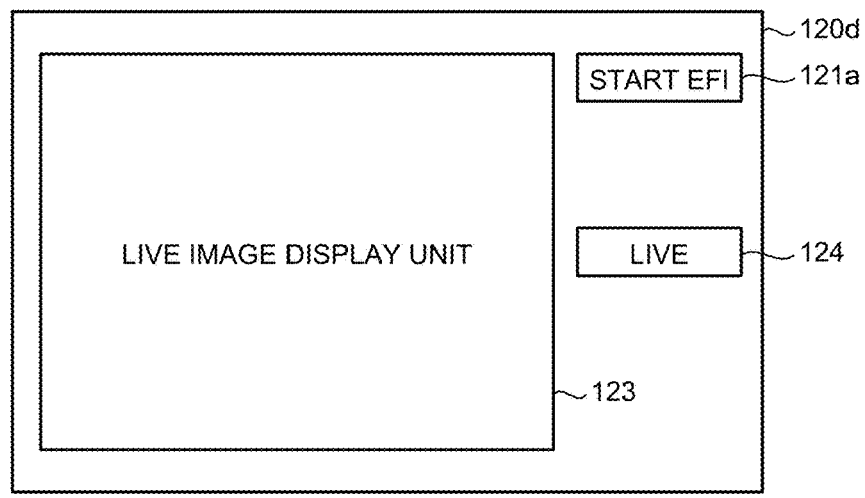
FIG. 14A is a diagram illustrating an example of an EFI generating screen displayed on a display unit in the microscope system according to the second embodiment.
Figure 14B:
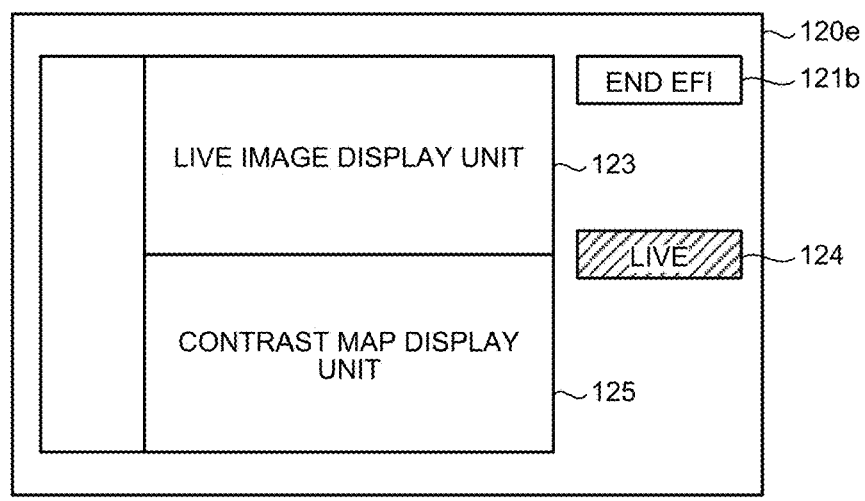
FIG. 14B is a diagram illustrating an example of the EFI generating screen displayed on the display unit in the microscope system according to the second embodiment.
Figure 14C:
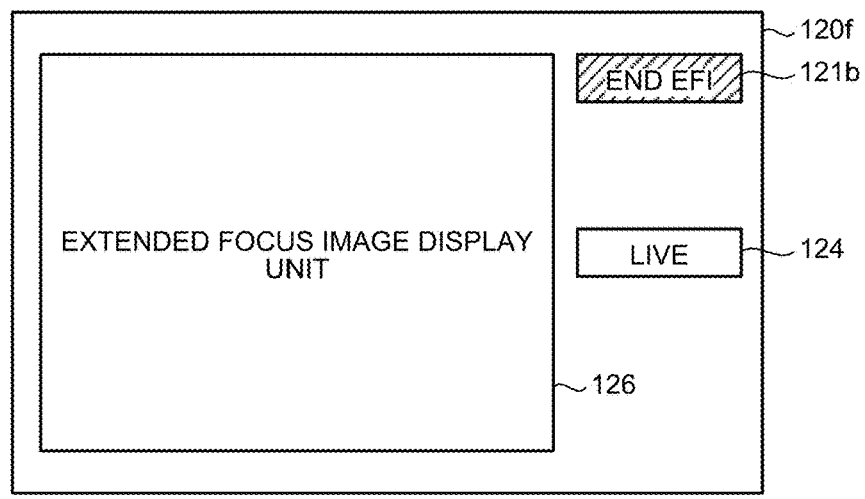
FIG. 14C is a diagram illustrating an example of the EFI generating screen displayed on the display unit in the microscope system according to the second embodiment.

FIG. 14A to FIG. 14C are diagrams each illustrating an example of an EFI generating screen displayed on the display unit 21 in a microscope system 100B according to the second embodiment.

An EFI generating screen 120d illustrated in FIG. 14A includes the EFI start button 121a that receives an input of the start signal for instructing to start EFI generation, the live image display unit 123 that displays a live image of the specimen 2 imaged by the imaging device 8, and the live image button 124 that receives an input of the signal for instructing to select the start/stop of the display of the live image performed on the live image display unit 123.

If an input of the start signal for instructing to start EFI generation is received by the EFI start button 121a, the display unit 21 displays an EFI generating screen 120e illustrated in FIG. 14B. The EFI generating screen 120e includes the EFI end button 121b that receives an input of the end signal for instructing to end of the EFI generation, the live image display unit 123, the live image button 124, and the contrast map display unit 125.

If an observer determines that, based on the contrast map displayed on the contrast map display unit 125, a desired extended focus image has been generated, the observer inputs an instruction to end of EFI generation by the EFI end button 121b on the EFI generating screen 120e illustrated in FIG. 14B. If the instruction to end of EFI is input, an EFI generating screen 120f illustrated in FIG. 14C is displayed on the display unit 21. The EFI generating screen 120f includes an extended focus image display unit 126 that displays an extended focus image. After having checked the extended focus image displayed on the extended focus image display unit 126, the observer instructs to select the live image button 124, whereby the EFI generating screen 120d illustrated in FIG. 14A is again displayed on the display unit 21.

Figure 15:
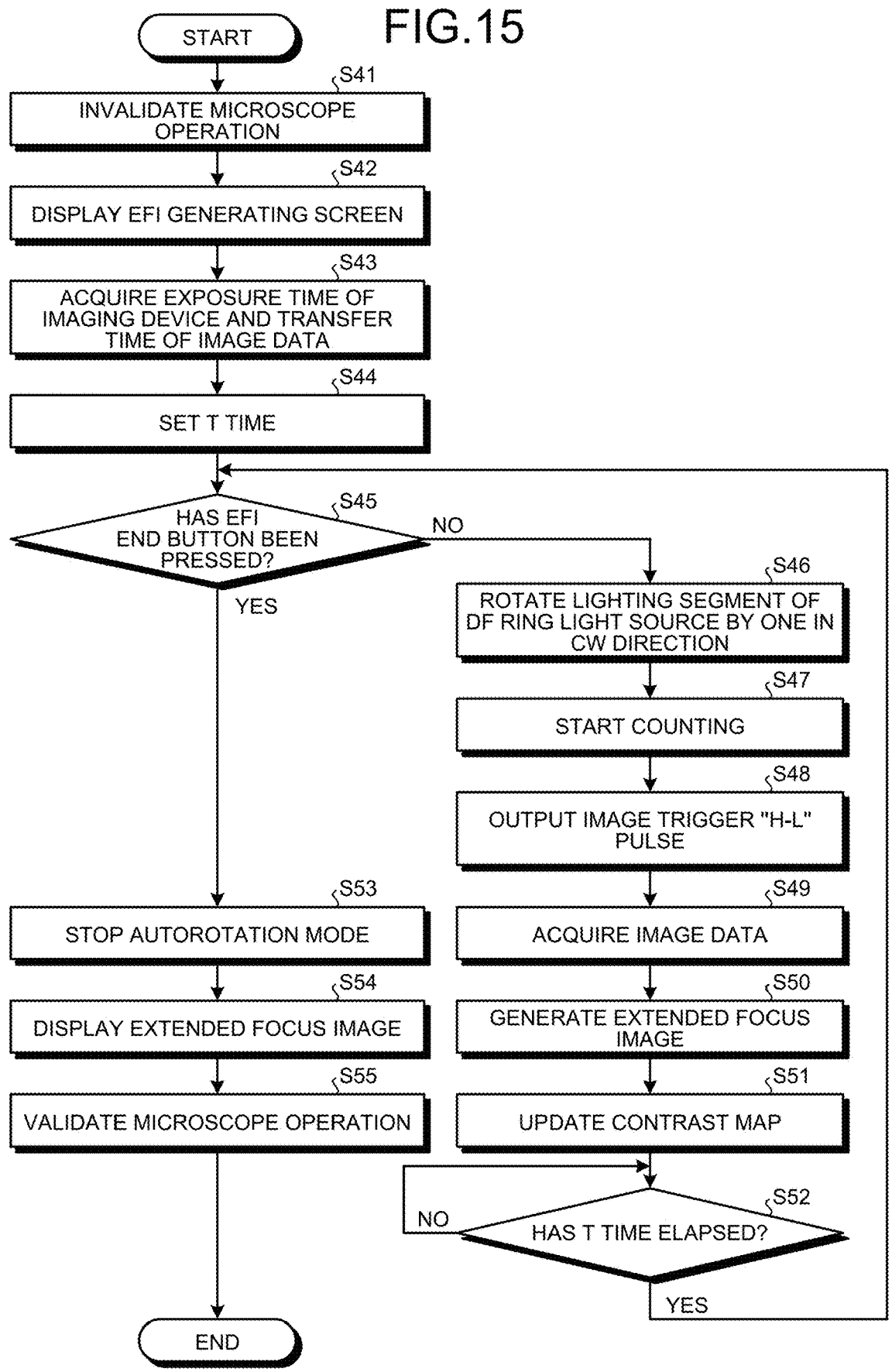
FIG. 15 is a flowchart in a case where EFI according to the second embodiment is generated.

If an input of the start signal for instructing to start EFI generation is received by the EFI start button 121a, an extended focus image is generated based on the flowchart illustrated in FIG. 15.

The control unit 9A sets the operation of each of the units in the microscope main body 1 to invalid (Step S41), and the EFI generating screen 120e is displayed on the display unit 21 (Step S42). The control unit 9A sets or acquires the exposure time of the imaging device 8 and acquires the transfer time of the image data (Step S43). The drive time setting unit 91 sets the lighting time T of the DF ring light source 6 based on the time of exposure and the transfer time (Step S44).

The EFI generating unit 25 determines whether the EFI end button 121b has been pressed (Step S45) and, if the EFI end button 121b is not pressed (No Step S45), the control unit 9A performs control such that the lighting segment of the DF ring light source 6 rotate by one clockwise (CW direction) (Step S46). After having changed the lighting segment, the control unit 9A starts counting (Step S47) and outputs an image trigger "H-L" pulse (Step S48).

After outputting the image trigger, the imaging device 8 acquires the image data (Step S49), and the EFI generating unit 25 calculates the contrast value of the acquired image data, extracts pixels indicating high contrast values, and generates an extended focus image (Step S50). Furthermore, the contrast map generating unit 26 generates a contrast map in which the contrast values of the generated extended focus image has been subjected to luminance conversion and updates the contrast map (Step S51).

The control unit 9A determines whether T time has been elapsed (Step S52) If T time has not been elapsed (No at Step S52), the control unit 9A repeats the process at Step S52, whereas, if T time has been elapsed (Yes at Step S52), the control unit 9A repeats the process starting from Step S45.

If the EFI generating unit 25 determines that the EFI end button 121*b* has been pressed (Yes at Step S45), the control unit 9A stops the autorotation mode that rotates the lighting segment of the DF ring light source 6 by one clockwise (CW direction) (Step S53) and displays the EFI generating screen 120*f* on the display unit 21. The extended focus image display unit 126 displays the extended focus image that was generated immediately before (Step S54). The control unit 9A sets the operation of the microscope main body 1 to valid (Step S55), and EFI generation is ended.

Figure 16:
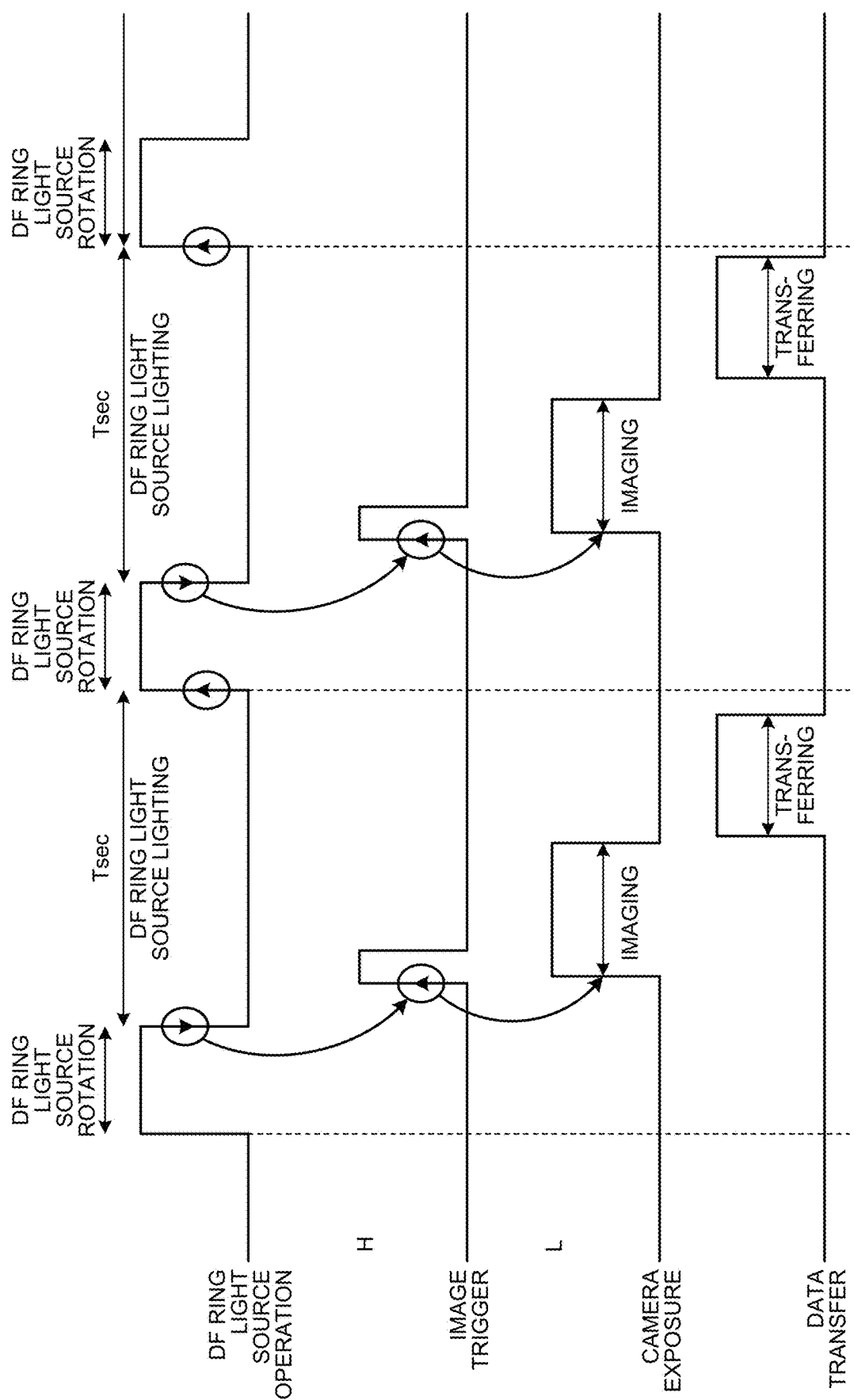
FIG. 16 is a timing chart in the microscope system according to the second embodiment.

FIG. 16 is a timing chart in the microscope system 100A according to the second embodiment. In the microscope system 100A, after the control unit 9A rotates the lighting segment of the DF ring light source 6, the image trigger enters from L to H. After the imaging device 8 detects the edge of the image trigger, the imaging device 8 starts exposure and performs imaging. The image data imaged and generated by the imaging device 8 is transferred to the image processing device 20. In the second embodiment, the above processes are controlled such that the lighting time of the DF ring light source 6 is T seconds, whereby the rotation of the lighting segment and imaging by the imaging device 8 are synchronized. Consequently, an observer may more simply acquire an extended focus image with high contrast.

In the second embodiment described above, the lighting segment of the DF ring light source 6 is automatically changed, and an extended focus image is generated based on all of the pieces of image data imaged by the imaging device 8; however, it is also possible to generate an extended focus image from the image data that is selected by an observer after the observer observes each of the pieces of image data that are automatically imaged.

Figure 17:
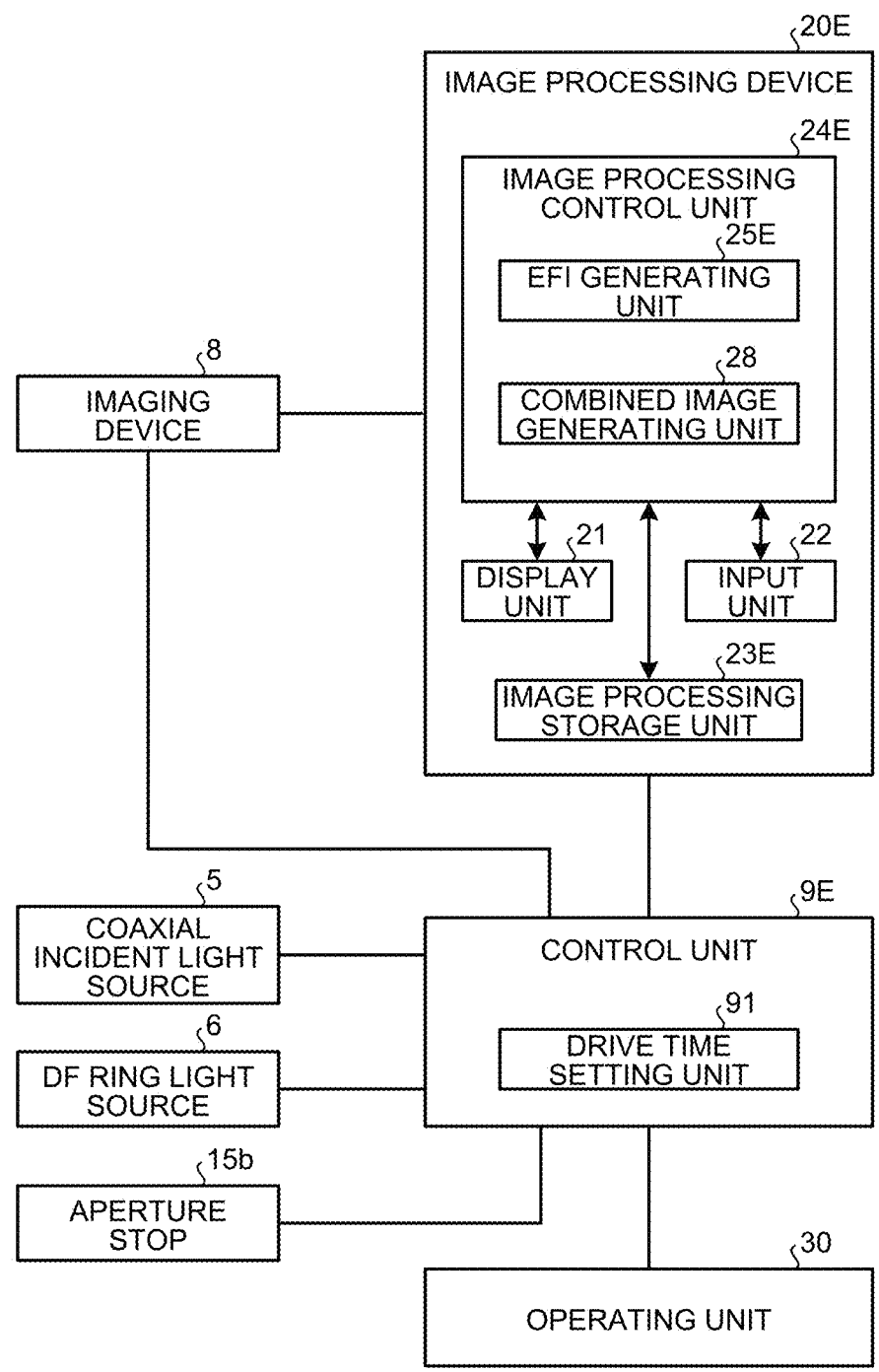
FIG. 17 is a schematic view illustrating, in outline, the configuration of a microscope system according to a first modification of the second embodiment.

FIG. 17 is a schematic view illustrating, in outline, the configuration of a microscope system according to a first modification of the second embodiment. FIG. 18A to FIG. 18D are diagrams each illustrating an example of an EFI generating screen displayed on the display unit 21 in the microscope system according to the first modification of the second embodiment.

Figure 18A:
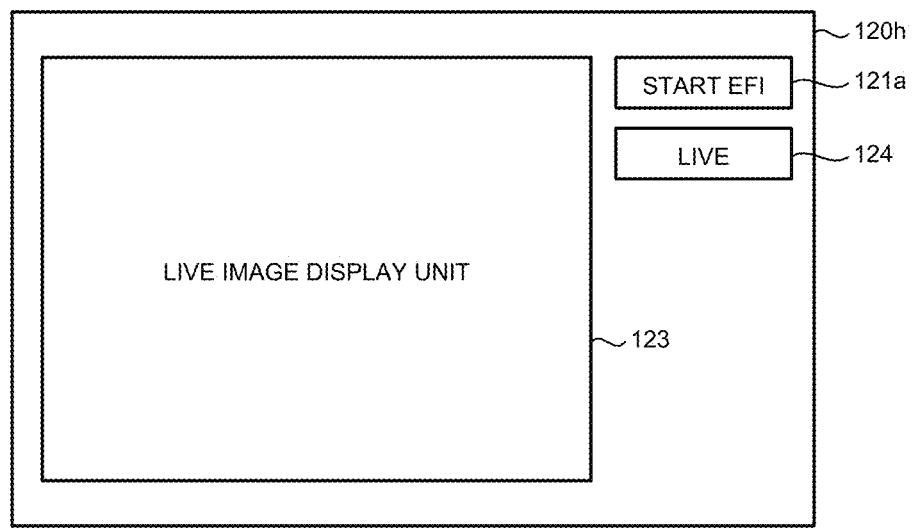
FIG. 18A is a diagram illustrating an example of an EFI generating screen displayed on a display unit in the microscope system according to the first modification of the second embodiment.

An EFI generating screen 120*h* illustrated in FIG. 18A includes the EFI start button 121*a* that receives an input of the start signal for instructing to start EFI generation, the live image display unit 123 that displays an live image of the specimen imaged by the imaging device 8, and the live image button 124 that receives an input of the signal for instructing to select the start/stop of the display of the live image performed on the live image display unit 123.

Figure 18B:
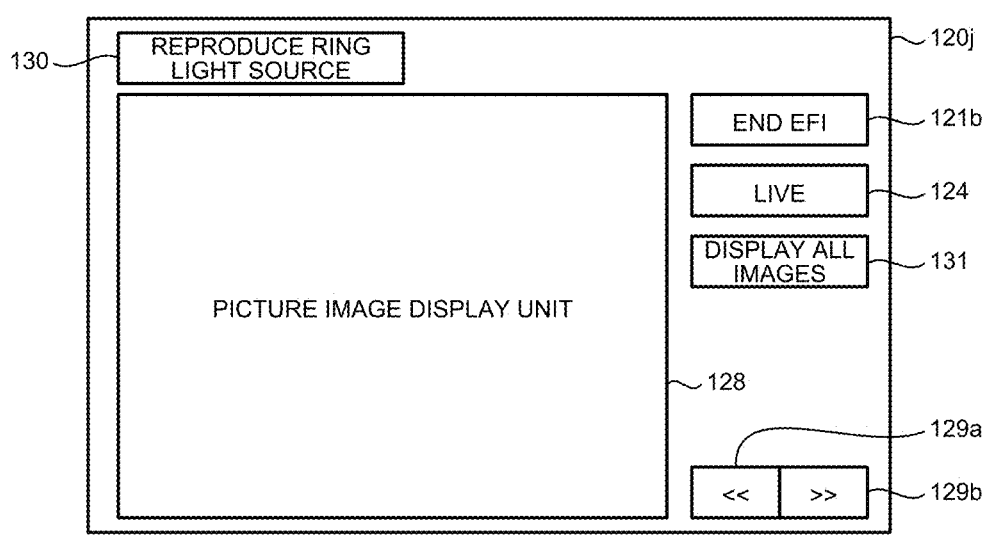
FIG. 18B is a diagram illustrating an example of the EFI generating screen displayed on the display unit in the microscope system according to the first modification of the second embodiment.

When an input of the start signal for instructing to start EFI generation is received by the EFI start button 121*a*, the display unit 21 displays an EFI generating screen 120*j* illustrated in FIG. 18B. The EFI generating screen 120*j* includes an EFI end button 121*b* that receives an input of the end signal for instructing to end the EFI generation, the live image button 124, a picture image display unit 128 that displays a picture image that is imaged by the imaging device 8 and that is stored in an image processing storage unit 23E by attaching segment information on the DF ring light source 6 at the time of imaging, a send button 129*a* that sends the picture image displayed on the picture image display unit 128 to the picture image of the subsequent segment, a return button 129*b* that returns the picture image to the picture image of the previous segment, a ring light source reproduction button 130 that reproduces the DF ring light source 6 onto the illumination segment of the DF ring light source 6 displayed on the picture image display unit 128, and an all-image display button 131 that displays the picture images of all of the imaged illumination segments.

Figure 18C:
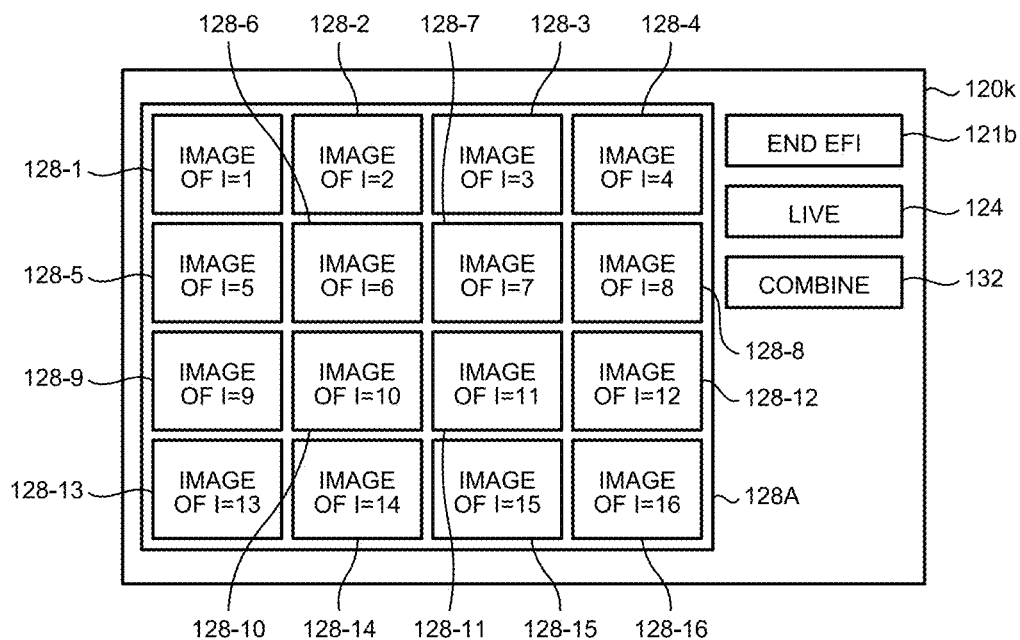
FIG. 18C is a diagram illustrating an example of the EFI generating screen displayed on the display unit in the microscope system according to the first modification of the second embodiment.

If the all-image display button 131 is pressed, the display unit 21 displays an EFI generating screen 120*k* illustrated in FIG. 18C. The EFI generating screen 120*k* includes the EFI end button 121*b*, the live image button 124, a picture image display unit 128A that displays the picture images of all of the illumination segments stored in the image processing storage unit 23E, and a combining button 132 that combines the picture images selected by the observer. In the first modification, when an observer observes the picture image displayed on the picture image display unit 128 illustrated in FIG. 18B or observes picture images 128-1 to 128-16 of all of the illumination segments displayed on the picture image display unit 128A illustrated in FIG. 18C, selects a desired image, and receives an input of the start signal for instructing to combine images by the press of the combining button 132, a combined image generating unit 28 generates a combined image of the selected picture images.

Figure 18D:
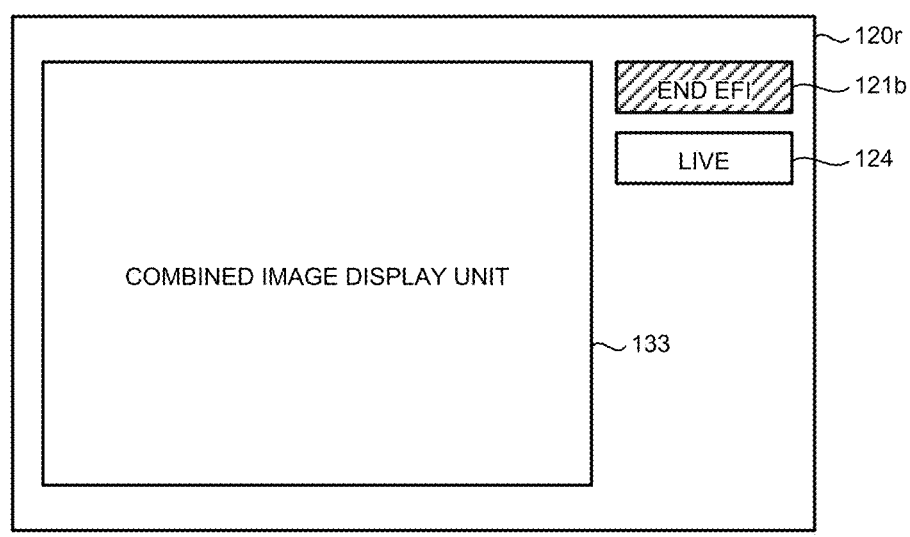
FIG. 18D is a diagram illustrating an example of the EFI generating screen displayed on the display unit in the microscope system according to the first modification of the second embodiment.

When the combining button 132 is pressed, the display unit 21 displays an EFI generating screen 120*r* illustrated in FIG. 18D. The EFI generating screen 120*r* includes the EFI end button 121*b*, the live image button 124, and a combined image display unit 133 that displays the combined image. After having checked the extended focus image displayed on the combined image display unit 133, the observer instructs to select the live image button 124, whereby the EFI generating screen 120*h* illustrated in FIG. 18A is again displayed on the display unit 21.

Figure 19:
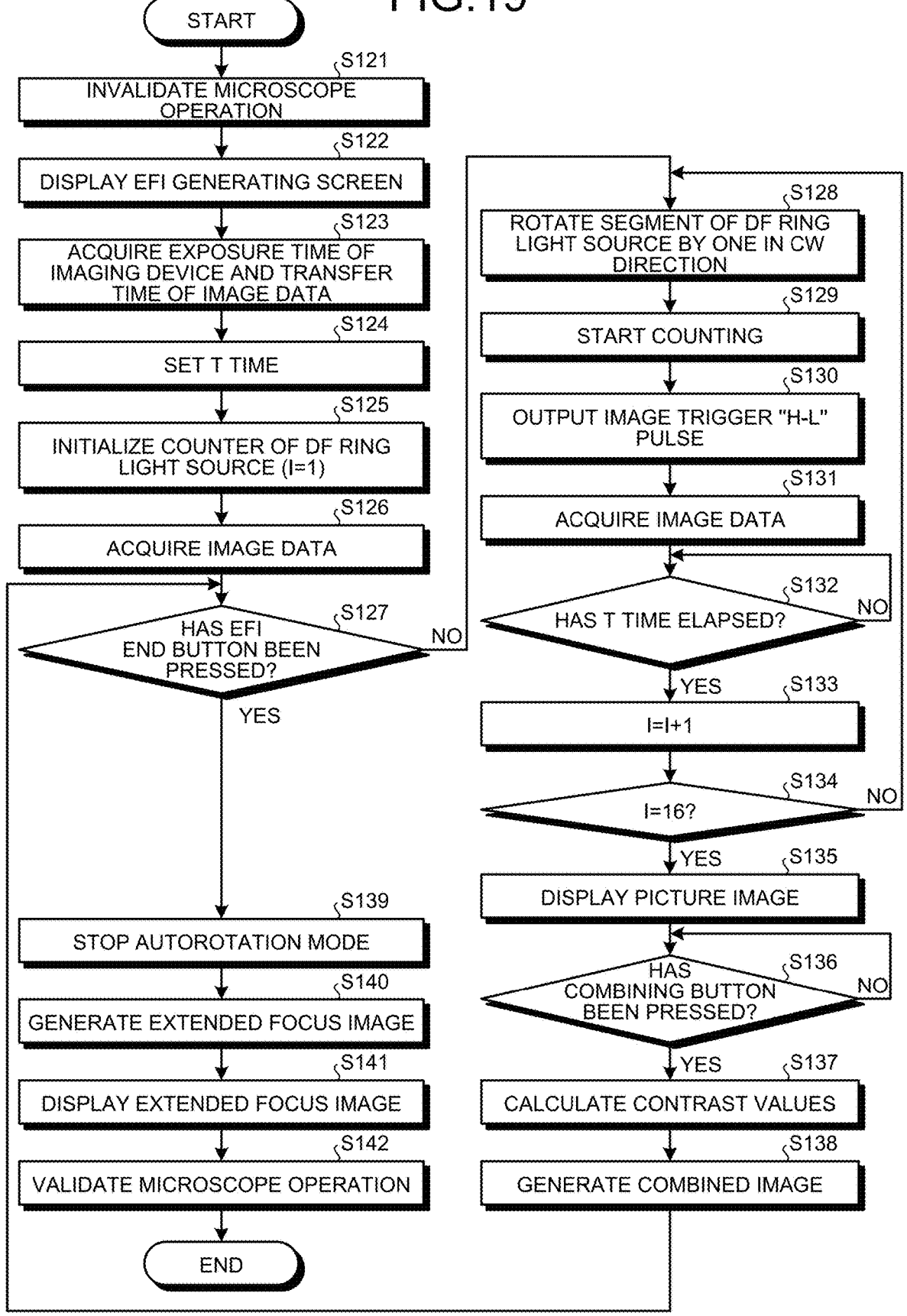
FIG. 19 is a flowchart in a case where EFI according to the first modification of the second embodiment is generated.

In the following, generating an extended focus image performed by the microscope system according to the first modification of the second embodiment will be described with reference to the drawings. FIG. 19 is a flowchart of EFI generation according to the first modification of the second embodiment.

In the first modification, similarly to the second embodiment, a control unit 9E sets the operation of each of the units in the microscope main body 1 to invalid (Step S121), and the EFI generating screen 120*h* is displayed on the display unit 21 (Step S122). The control unit 9E sets or acquires the exposure time of the imaging device 8 and acquires the transfer time of the image data (Step S123). The drive time setting unit 91 sets the lighting time T of the DF ring light source 6 based on the time of exposure and the transfer time (Step S124).

Thereafter, a counter I of the DF ring light source 6 is initialized (I=1) (Step S125), and the imaging device 8 acquires image data (Step S126). An EFI generating unit 25E determines whether the EFI end button 121*b* has been pressed (Step S127) and, if the EFI end button 121*b* is not pressed (No at Step S127), the control unit 9E performs control such that the lighting segment of the DF ring light source 6 rotates by one clockwise (CW direction) (Step S128). After having changed the lighting segment, the control unit 9E starts counting (Step S129) and outputs the image trigger "H-L" pulse (Step S130). Furthermore, the imaging device 8 acquires the image data (Step S131) and the image data is stored in the image processing storage unit 23E together with the segment information.

The control unit 9E determines whether T time has elapsed (Step S132). If T time has not elapsed (No at Step S132), the control unit 9E repeats the process at Step S132, whereas, if T time has elapsed (Yes at Step S132), the control unit 9E updates the counter I of the DF ring light source 6 (I=I+1) (Step S133).

The control unit 9E determines whether the counter I of the DF ring light source 6 is 16 (Step S134). If the counter I is not 16 (No at Step S134), the control unit 9E repeats the process from Step S128. If the counter I is 16 (Yes at Step S134), the control unit 9E displays the picture image indicating that the counter I is 1 on the picture image display unit 128 (Step S135).

The control unit 9E determines whether the combining button 132 has been pressed (Step S136). If the combining button 132 is not pressed (No at Step S136), the control unit 9E repeats the process at Step S136, whereas, if the combining button 132 has been pressed (Yes at Step S136), the combined image generating unit 28 calculates the contrast value of the selected picture image (Step S137), extracts pixels indicating high contrast values, generates and stores the combined image (Step S138), and repeats the process from Step S127.

If the EFI generating unit 25E determines that the EFI end button 121b has been pressed (Yes at Step S127), the control unit 9E stops the autorotation mode in which the lighting segment of the DF ring light source 6 rotates by one clockwise (CW direction) (Step S139). The EFI generating unit 25E generates an extended focus image from the plurality of recorded combined images (Step S140) and displays the generated extended focus image on the extended focus image display unit (Step S141). The control unit 9E sets the operation of the microscope main body 1 to valid (Step S142), and the EFI generation is ended.

In the first modification according to the second embodiment, the picture image imaged by changing the lighting segment of the DF ring light source 6 may be observed for each image or may be observed by comparing the subject picture image with all of the imaged picture images and thus an appropriate illumination condition in accordance with the specimen 2 may be easily searched. Furthermore, because the ring light source reproduction button 130 is included, an appropriate illumination condition may be automatically set by simply pressing the ring light source reproduction button 130, and then, by pressing the live image button 124, an immediate observation is possible under the illumination condition in which the specimen 2 is selected.

Figure 20:
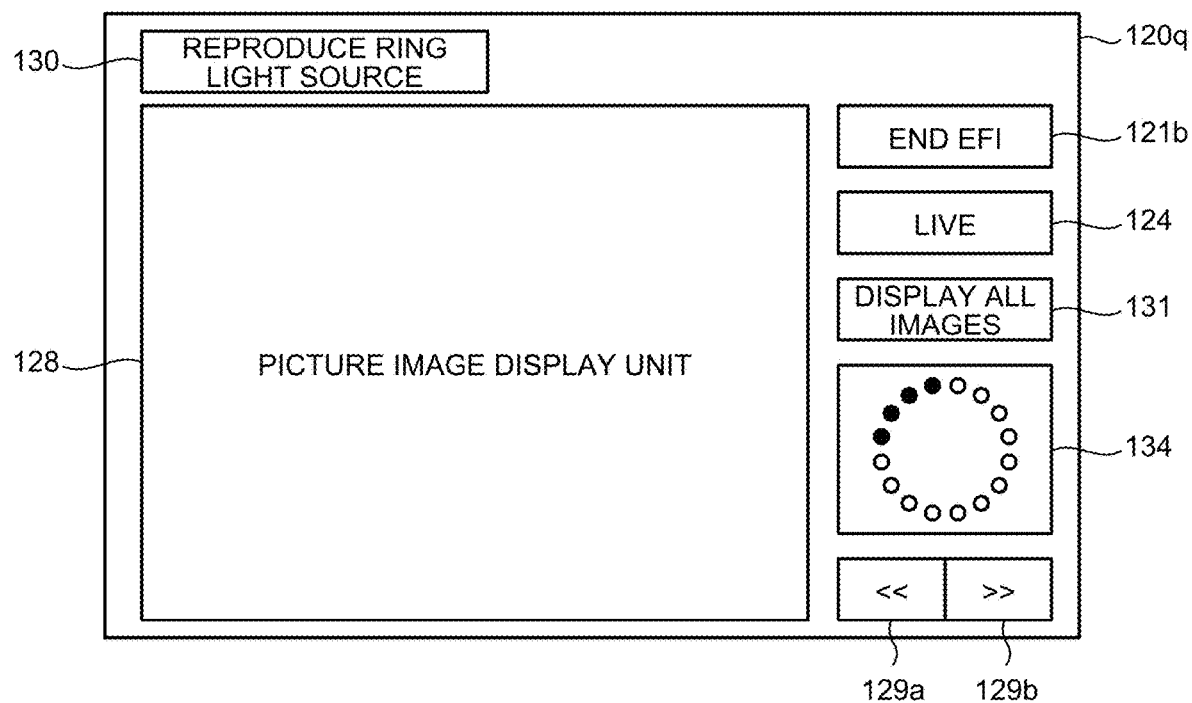
FIG. 20 is a diagram illustrating an example of an EFI generating screen displayed on a display unit in a microscope system according to a second modification of the second embodiment.

In the first modification according to the second embodiment, when an input of the start signal for instructing to start EFI generation is received by the EFI start button 121a in the EFI generating screen 120h, the display unit 21 displays the EFI generating screen 120j; however, the display unit 21 may also display an EFI generating screen 120q. FIG. 20 is a diagram illustrating an example of the EFI generating screen displayed on the display unit in the microscope system according to a second modification of the second embodiment.

The EFI generating screen 120q includes the EFI end button 121b, the live image button 124, the picture image display unit 128, the send button 129a, the return button 129b, the ring light source reproduction button 130, the all-image display button 131, and an illumination segment display unit 134 that displays the illumination segment of the DF ring light source 6 at the time of imaging a picture image displayed on the picture image display unit 128. Because the illumination segment of the DF ring light source 6 is displayed on the illumination segment display unit 134, it is possible easily grasp the illumination condition.

In the second embodiment and the first and the second modifications described above, an observer may easily obtain an extended focus image without operating the DF ring light source 6; however, movement of the specimen 2 in the Z-axis direction needs to be performed by an observer operating the focusing handle 16. An EFI may also be generated by arranging a motor on the stage 3 on which the specimen 2 is mounted and by the control unit controlling the movement of the specimen 2 in the Z-axis direction.

Figure 21:
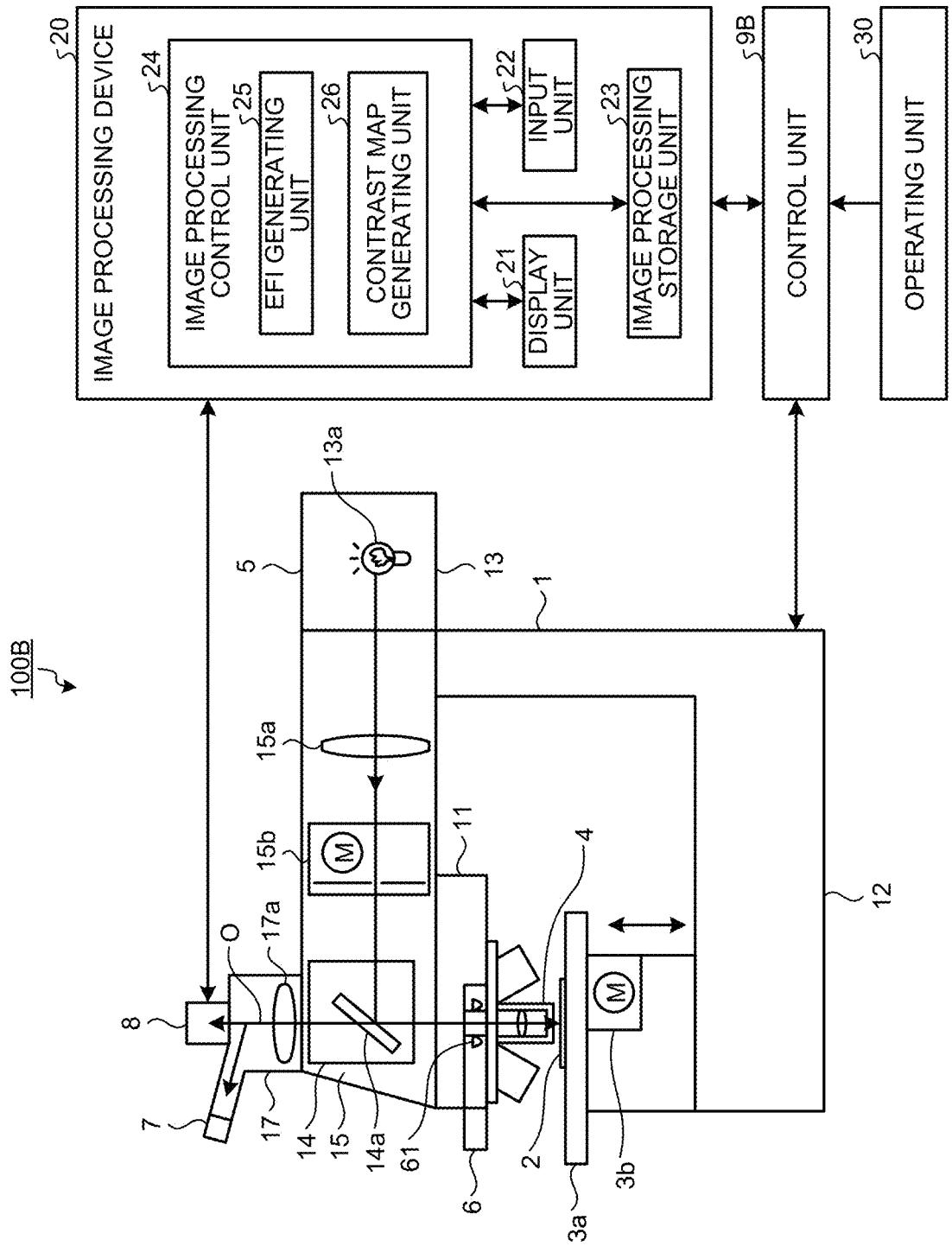
FIG. 21 is a schematic view illustrating, in outline, the configuration of a microscope system according to a third modification of the second embodiment.
Figure 22:
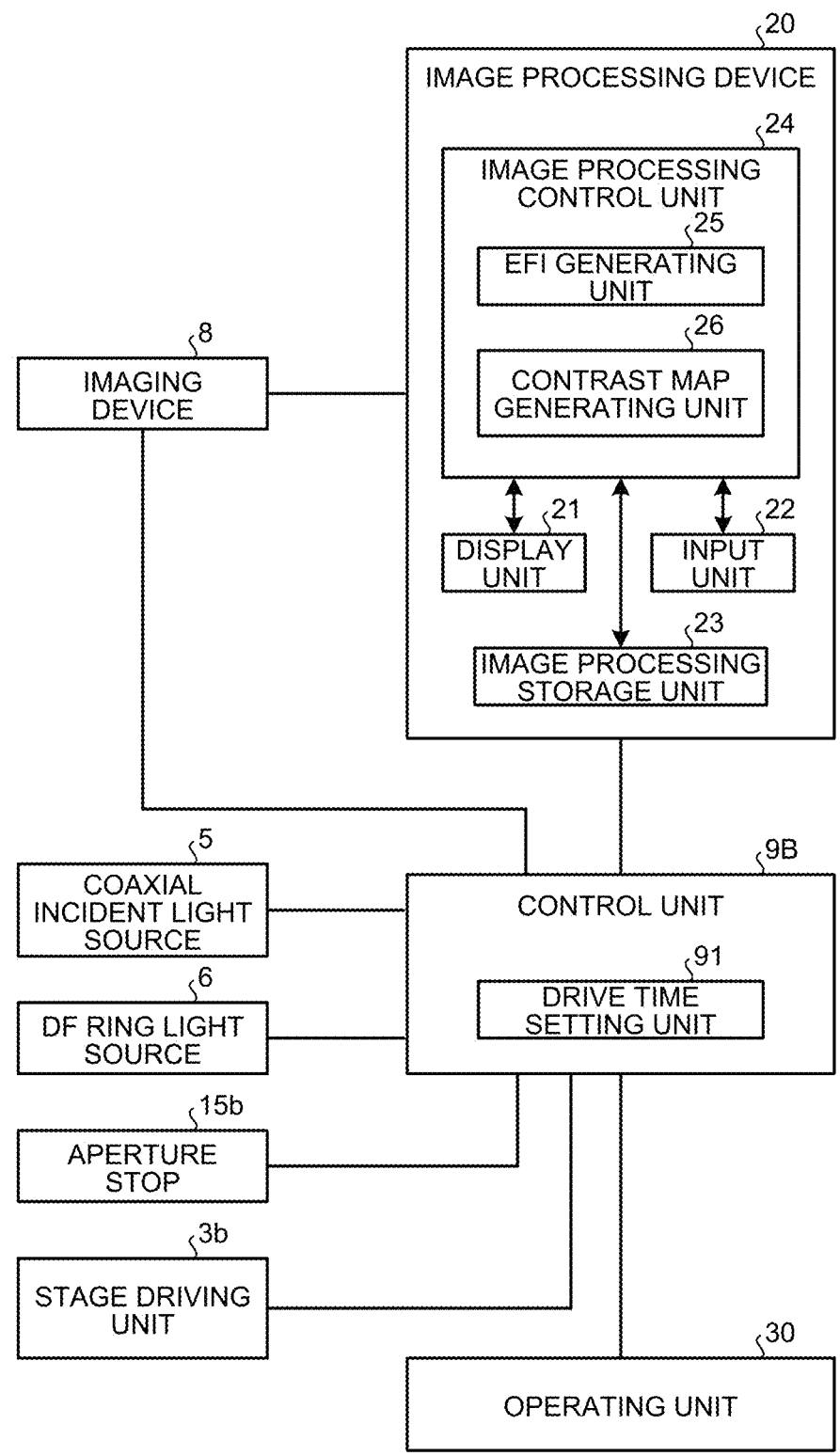
FIG. 22 is a block diagram illustrating the configuration of a communication system in a microscope system according to the third modification of the second embodiment.
Figure 23:
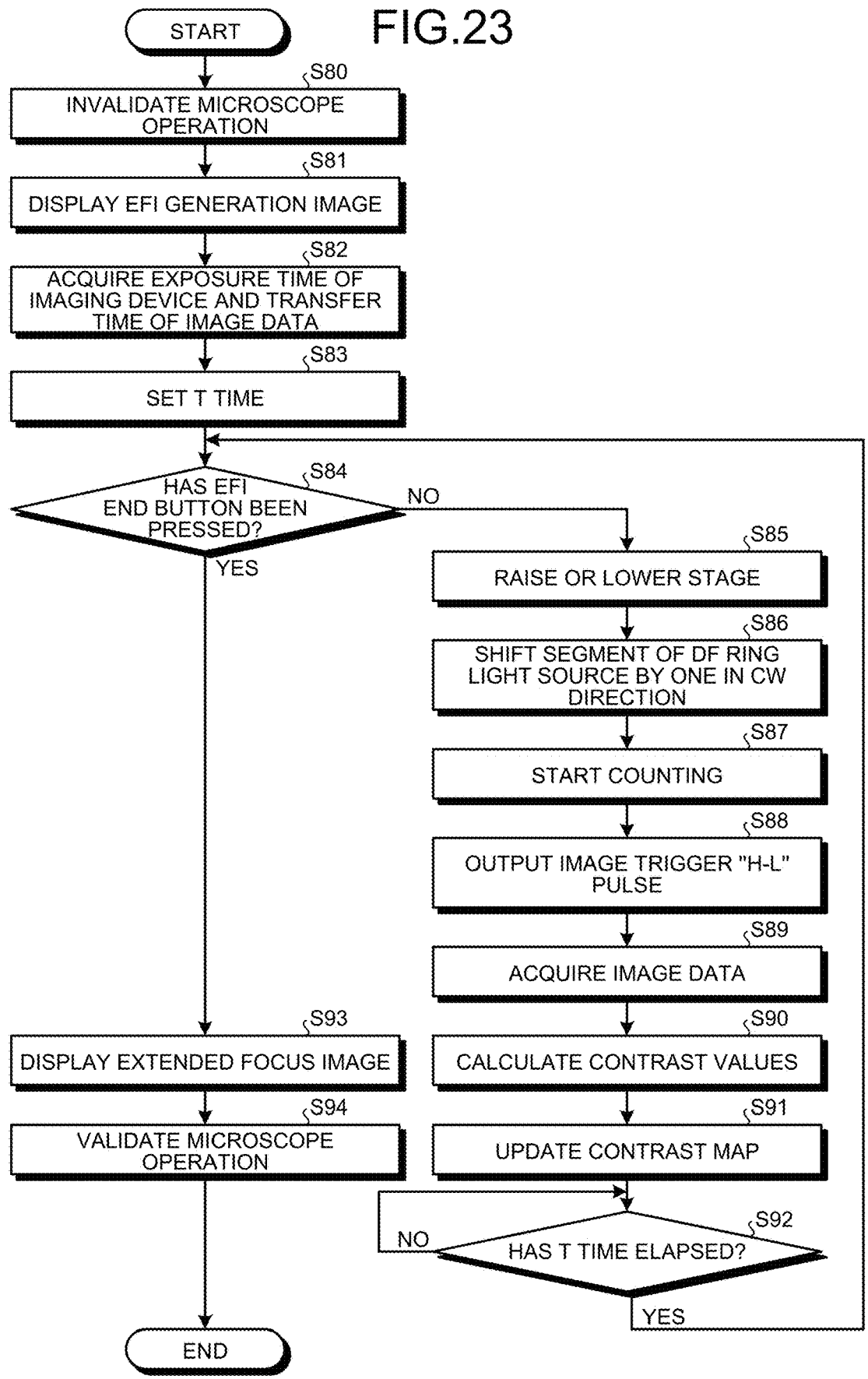
FIG. 23 is a flowchart at the time of generating an EFI performed by the microscope system according to the third modification of the second embodiment.

FIG. 21 is a schematic view illustrating, in outline, the configuration of the microscope system 100B according to a third modification of the second embodiment. FIG. 22 is a block diagram illustrating the configuration of the communication system in the microscope system 100B according to the third modification of the second embodiment. FIG. 23 is a flowchart at the time of generating an EFI by the microscope system 100B according to the third modification of the second embodiment.

The microscope system 100B includes a stage 3a and a stage driving unit 3b that moves the stage 3a in the Z-axis direction. A control unit 9B controls the stage driving unit 3b and moves the stage 3a in the Z-axis direction.

If an input of the start signal for instructing to start EFI generation is received by the EFI start button 121a, an extended focus image is generated based on the flowchart illustrated in FIG. 23.

The control unit 9B sets the operation of each of the units in the microscope main body 1 to invalid (Step S80), and the EFI generating screen is displayed on the display unit 21 (Step S81). The control unit 9B sets or acquires the exposure time of the imaging device 8 and acquires the transfer time of the image data (Step S82). The drive time setting unit 91 sets the lighting time T of the DF ring light source 6 based on the time of exposure and the transfer time (Step S83).

The EFI generating unit 25 determines whether the EFI end button 121b has been pressed (Step S84). If the EFI end button 121b is not pressed (No at Step S84), the control unit 9B controls the stage driving unit 3b and raises or lowers the stage 3a (Step S85). After moving in the Z-axis direction of the stage 3a, the processes at Step S86 to Step S92 are performed similarly to that performed at Step S46 to Step S52 in the second embodiment.

If the EFI generating unit 25 determines that the EFI end button 121b has been pressed (Yes at Step S84), the EFI generating unit 25 displays the EFI generating screen on the display unit 21 and displays, on the extended focus image display unit 126, the extended focus image that was generated immediately before (Step S93). The control unit 9B sets the operation of the microscope main body 1 to valid (Step S94), and the EFI generation is ended.

In the third modification of the second embodiment, because the lighting segment of the DF ring light source 6 is automatically rotated and a movement of the stage 3a in the Z-axis direction is automatically performed, an observer may more easily acquire an extended focus image with high contrast.

Third Embodiment

Figure 24:
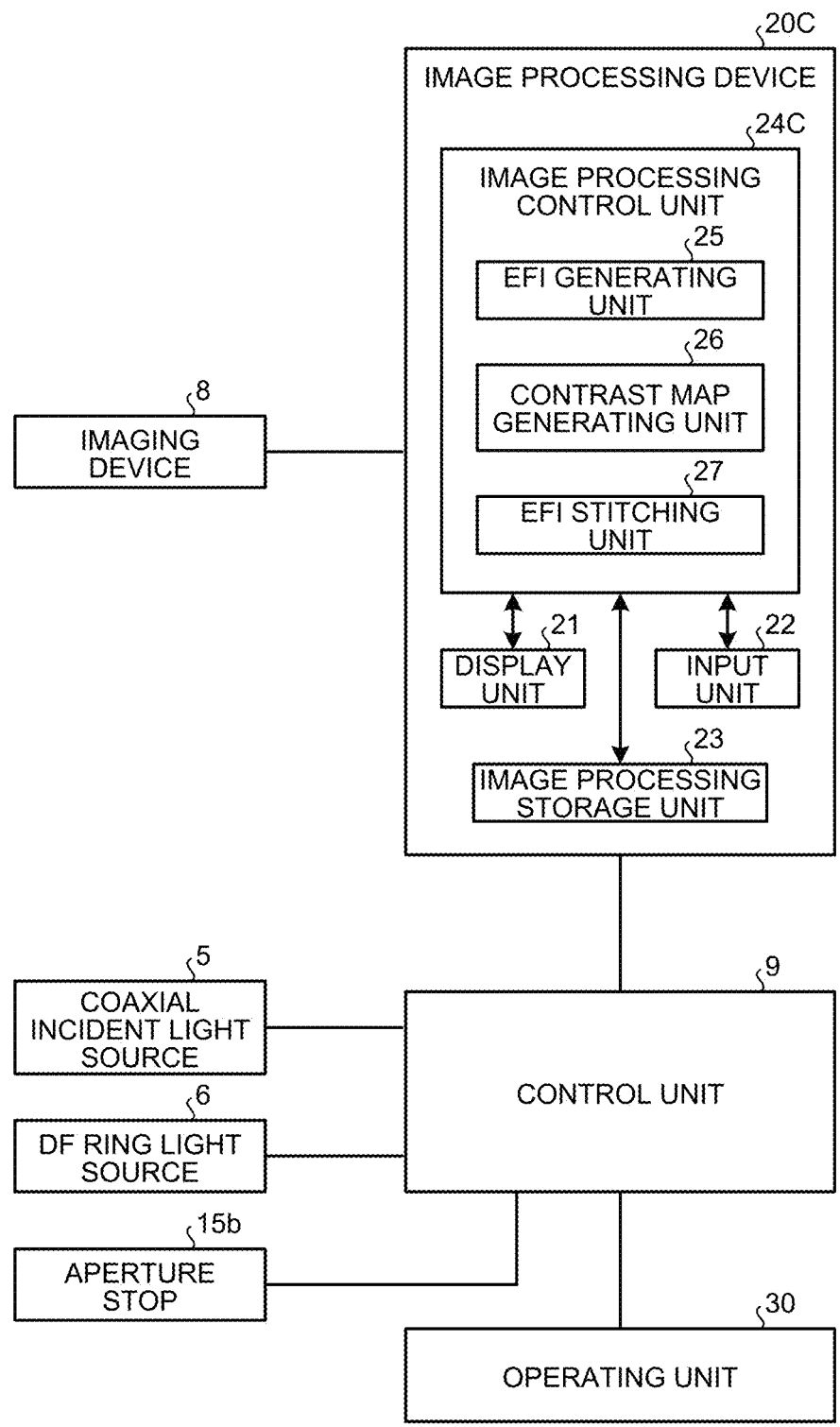
FIG. 24 is a block diagram illustrating the configuration of a communication system in the microscope system according to the third embodiment.
Figure 25:
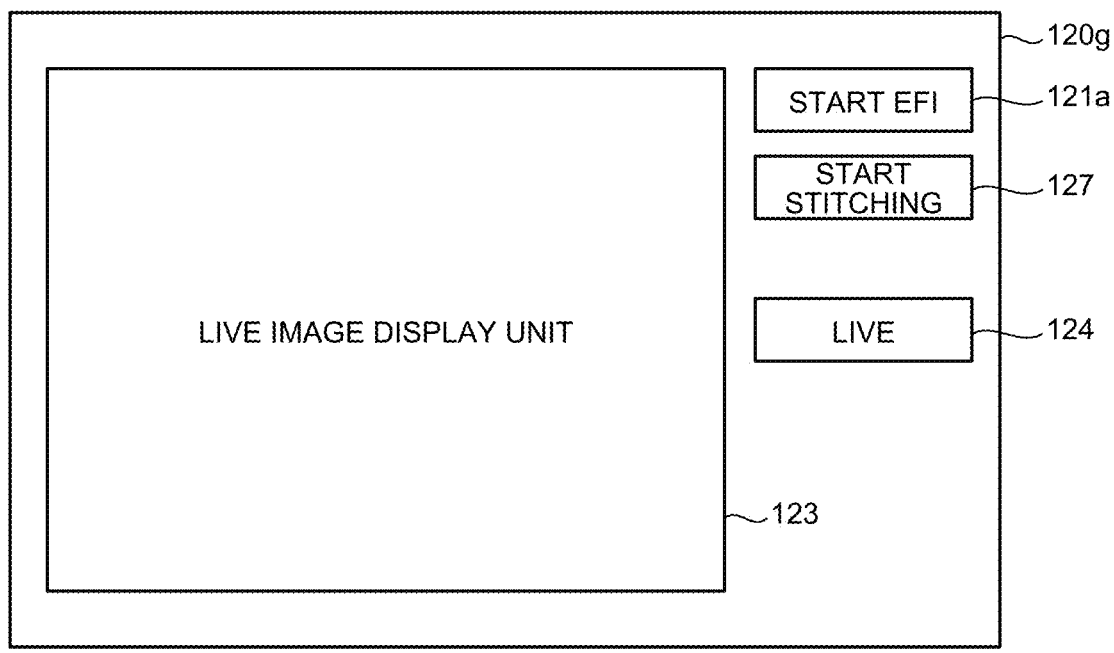
FIG. 25 is a diagram illustrating an example of an EFI generating screen displayed on a display unit in the microscope system according to the third embodiment.
Figure 26:
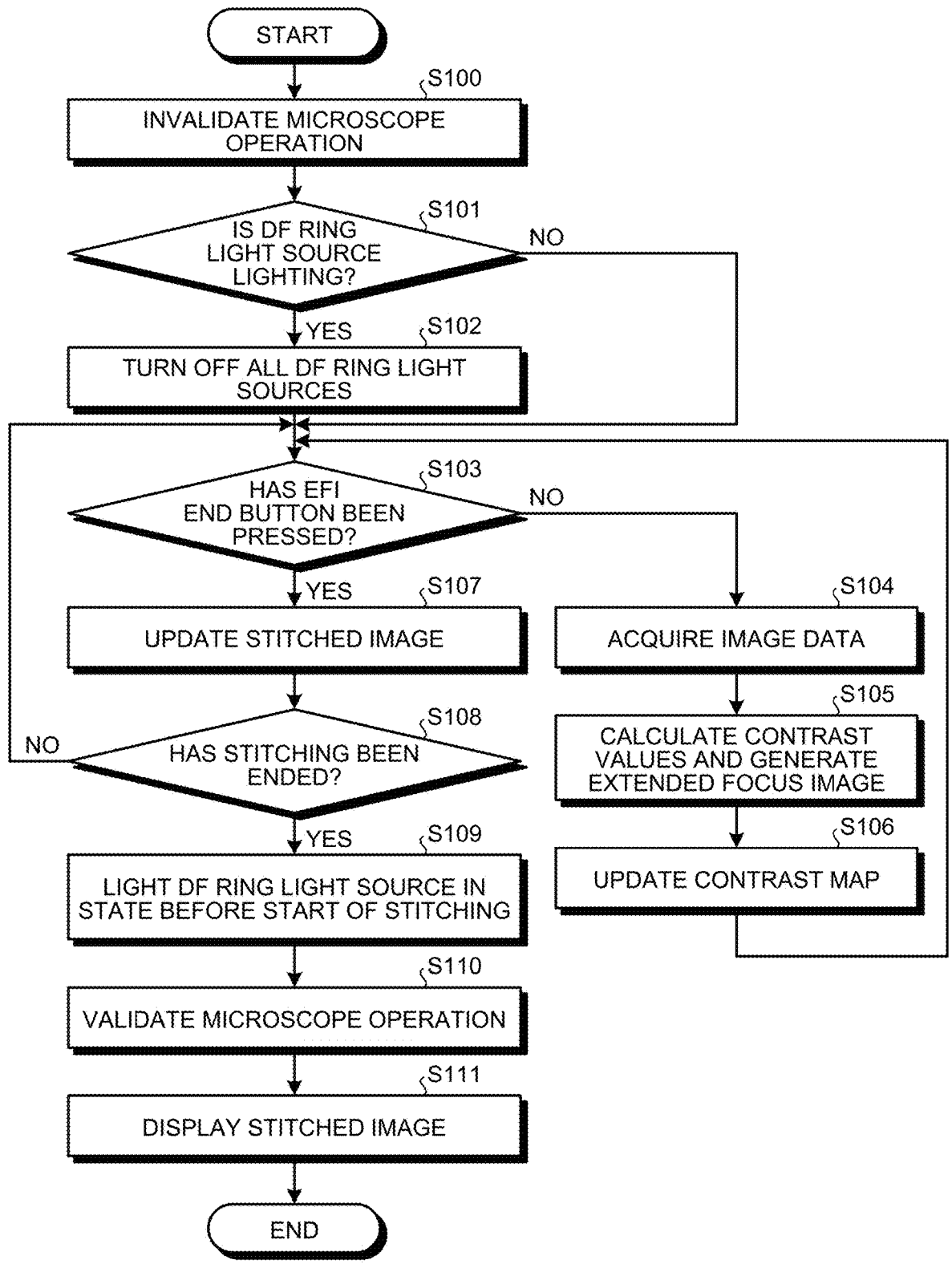
FIG. 26 is a flowchart at the time of generating an EFI performed by the microscope system according to the third embodiment.

A microscope system according to a third embodiment is not only able to generate an extended focus image but also to stitch an extended focus image. FIG. 24 is a block diagram illustrating the configuration of the communication system in the microscope system according to the third embodiment. FIG. 25 is a diagram illustrating an example of an EFI generating screen displayed on a display unit in the microscope system according to the third embodiment. FIG. 26 is a flowchart at the time of EFI generation performed by the microscope system according to the third embodiment.

In the microscope system according to the third embodiment, the image processing device 20C includes an EFI stitching unit 27 that stitches the generated extended focus images.

In the microscope system according to the third embodiment, an EFI generating screen 120g includes the EFI start button 121a that receives an input of the start signal for instructing to start EFI generation, the live image display unit 123 that displays a live image of the specimen 2 imaged by the imaging device 8, the live image button 124 that receives an input of the signal for instructing to select the start/stop of the display of the live image performed on the live image display unit 123, and a stitch button 127 that receives an instruction to stitch the generated extended focus image.

In the microscope system according to the third embodiment, if an instructions to generate and stitch the EFIs are received by the EFI start button 121a and the stitch button 127 in the EFI generating screen 120g, the control unit 9 sets the operation of each of the units in the microscope main body 1 to invalid, i.e., the observation condition is not able to be changed (Step S100), and determines whether the DF ring light source 6 is lighting (Step S101). If the control unit 9 determines that the DF ring light source 6 is lighting (Yes at Step S101), the control unit 9 turns off all of the pieces of the LED illumination 61 of the DF ring light source 6 (Step S102).

If the control unit 9 determines that the DF ring light source 6 is not lighting (No at Step S101), the EFI generating unit 25 determines whether the EFI end button has been pressed (Step S103). If the EFI end button is not pressed (No at Step S103), the image data is acquired by the imaging device 8 (Step S104), and the EFI generating unit 25 calculates a contrast value for each pixel of the acquired image data, extracts the pixels indicating the contrast values that are higher than those of the previous extended focus image, and generates the extended focus image (Step S105).

If the EFI generating unit 25 generates an extended focus image, the contrast map generating unit 26 generates and updates a contrast map in which the contrast value of the generated extended focus image has been subjected to luminance conversion (Step S106). If the EFI generating unit 25 determines that the EFI end button is not pressed (No at Step S10), the processes at Step S104 to Step S106 are repeated.

If the EFI generating unit 25 determines that the EFI end button has been pressed (Yes at Step S103), the EFI stitching unit 27 stitches the extended focus image and updates the stitched image (Step S107). The EFI stitching unit 27 determines whether an instruction to end the stitching has been received (Step S108) and, if an end instruction is not received (No at Step S108), processes at Step S103 to Step S108 are repeated. If the instruction to end the stitching is received (Yes at Step S108), the DF ring light source 6 is made to the state before the state of stitching (Step S109), and the control unit 9 sets the operation of the microscope main body 1 to valid (Step S110). A stitched EFI image is displayed on the display unit 21 (Step S111), and EFI stitching is ended.

In the third embodiment, the observation condition is not able to be changed, EFIs are generated under the same condition, and the generated EFIs are stitched. In the third embodiment, all of the pieces of the LED illumination 61 of the DF ring light source 6 are turned off; however, all of the pieces of the LED illumination 61 of the DF ring light source 6 may also be turned on as long as an EFI may be generated under the same condition or, alternatively, an EFI may also be generated by performing stitching in an autorotation mode in which the lighting segment of the DF ring light source 6 rotates by one in the 90-degree lighting mode clockwise (CW direction).

Fourth Embodiment

Figure 27:
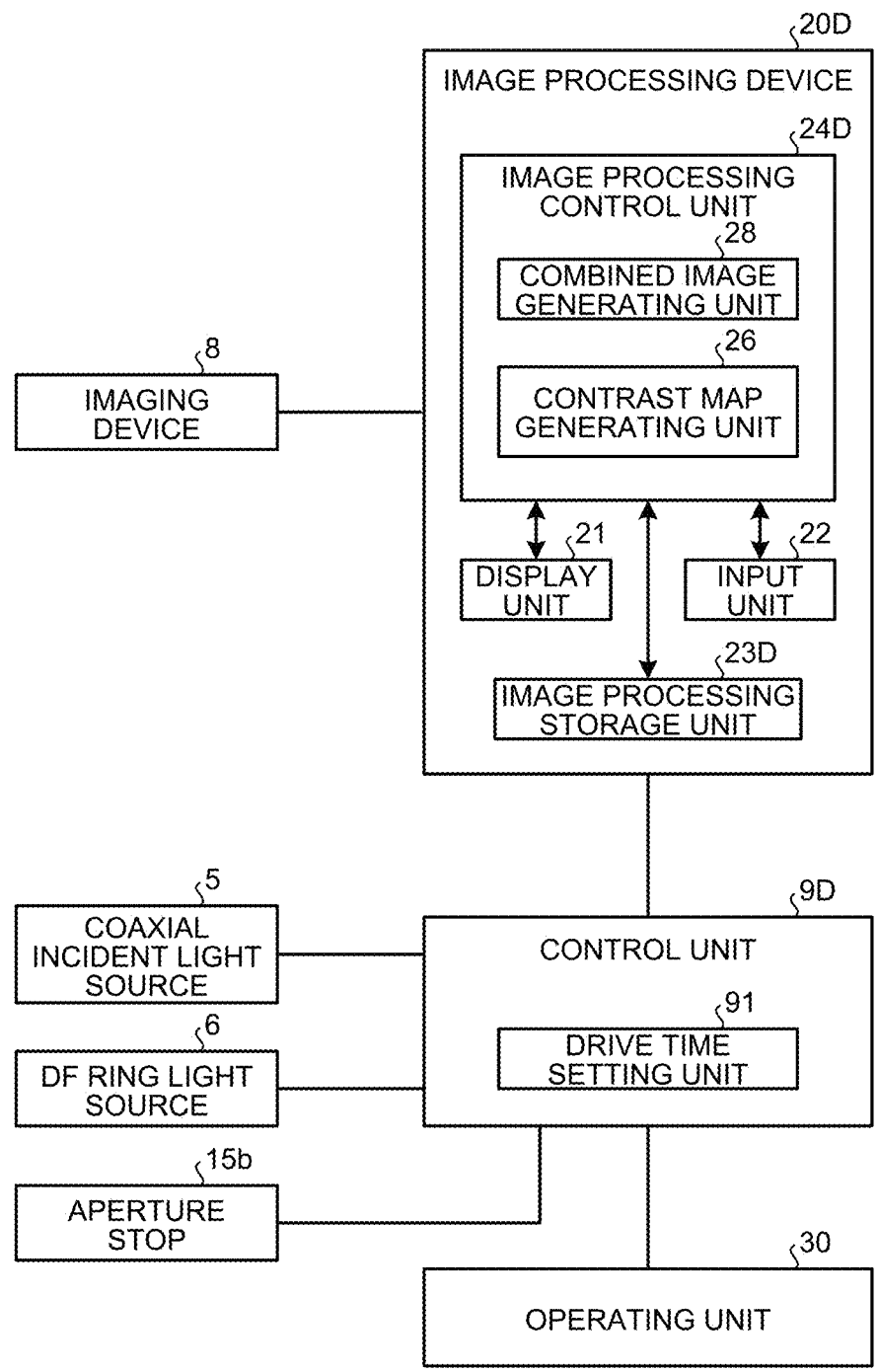
FIG. 27 is a block diagram illustrating the configuration of a communication system in a microscope system according to a fourth embodiment.
Figure 28A:
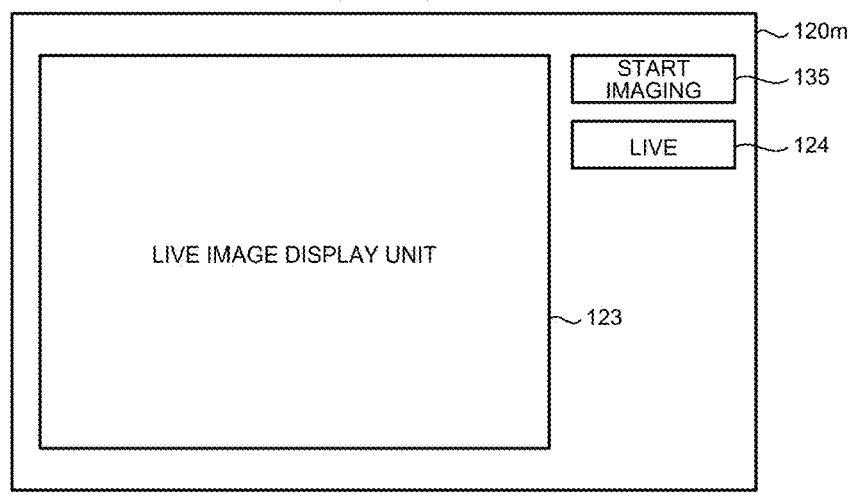
FIG. 28A is a diagram illustrating an example of an image combining screen displayed on a display unit in the microscope system according to the fourth embodiment.
Figure 28B:
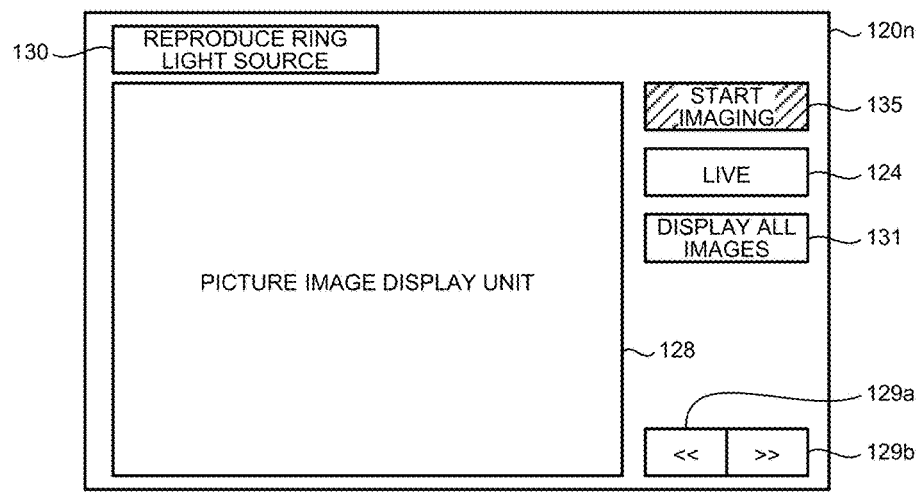
FIG. 28B is a diagram illustrating an example of the image combining screen displayed on the display unit in the microscope system according to the fourth embodiment.
Figure 28C:
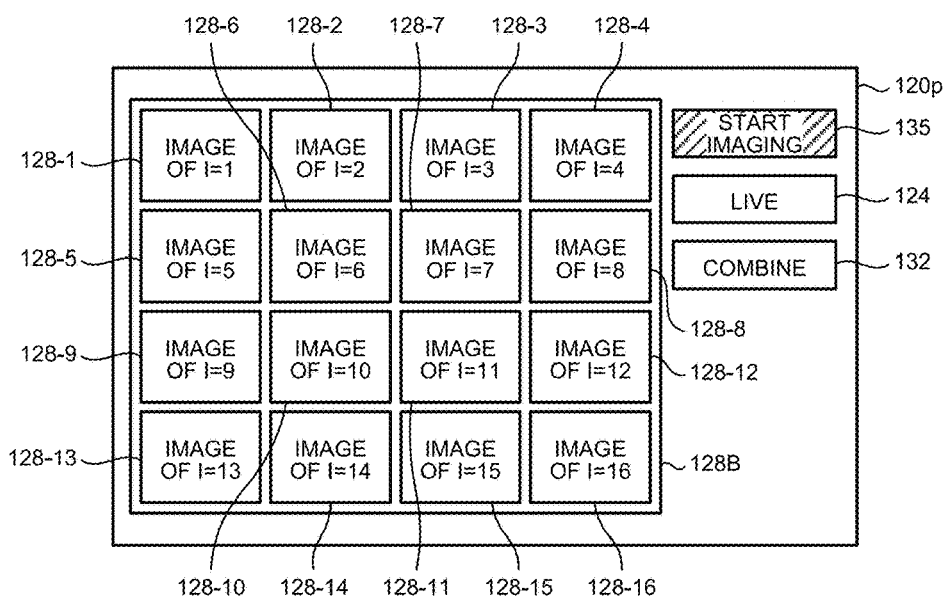
FIG. 28C is a diagram illustrating an example of the image combining screen displayed on the display unit in the microscope system according to the fourth embodiment.
Figure 29:
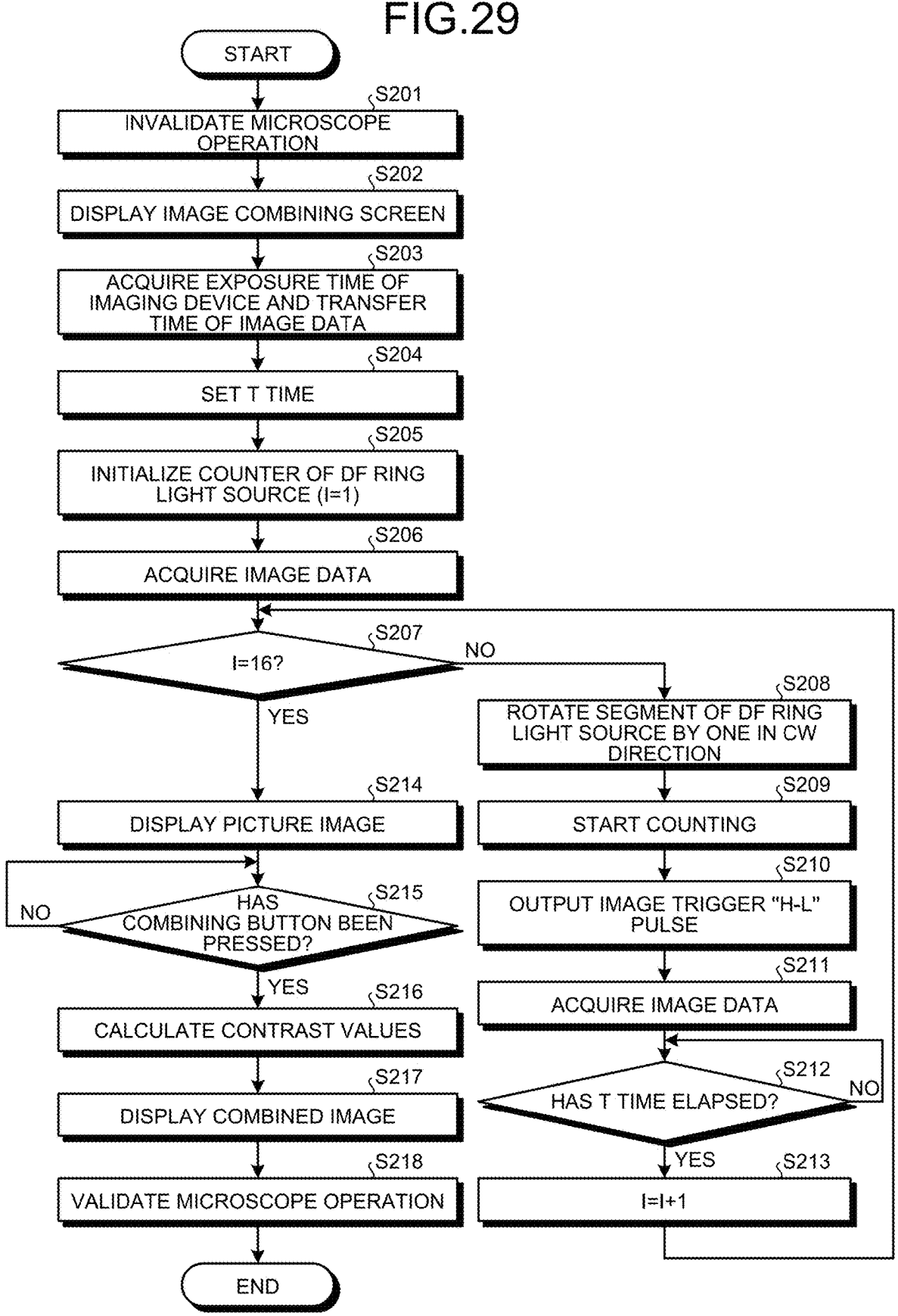
FIG. 29 is a flowchart at the time of generating a combined image performed by the microscope system according to the fourth embodiment.

In a microscope system according to a fourth embodiment, a combined image is generated by the imaging device 8 performing imaging while automatically changing the illumination segment of the DF ring light source 6. FIG. 27 is a block diagram illustrating the configuration of a communication system in a microscope system according to a fourth embodiment. FIG. 28A to FIG. 28C are diagrams each illustrating an example of an image combining screen displayed on a display unit in the microscope system according to the fourth embodiment. FIG. 29 is a flowchart at the time of generating a combined image by the microscope system according to the fourth embodiment.

An image combining screen 120m illustrated in FIG. 28A includes an image start button 135 that receives an input of the start signal for instructing the imaging start, a live image display unit 123, and a live image button 124.

If the image start button 135 receives an input of the start signal for instructing to start imaging, the display unit 21 displays an image combining screen 120n illustrated in FIG. 28B. The image combining screen 120n includes the image start button 135, the live image button 124, the picture image display unit 128, the send button 129a, the return button 129b, the ring light source reproduction button 130 that reproduces the DF ring light source 6 to the illumination segment of the DF ring light source 6 displayed on the picture image display unit 128, and the all-image display button 131 that displays the imaged picture image of all of the illumination segments.

If the all-image display button 131 is pressed, the display unit 21 displays an image combining screen 120p illustrated in FIG. 28C. The image combining screen 120p includes the image start button 135, the live image button 124, a picture image display unit 128B that displays a picture image of all of the illumination segments stored in the image processing storage unit 23E, and the combining button 132 that combines the picture images selected by an observer. In the fourth embodiment, when the observer observes the picture image displayed on the picture image display unit 128 illustrated in FIG. 28B or observes the picture images 128-1 to 128-16 of all of the illumination segments displayed on the picture image display unit 128B illustrated in FIG. 28C, selects a desired image, and receives an input of the start signal for instructing to combine the images by the press of the combining button 132, the combined image generating unit 28 generates a combined image of the selected picture image.

In the fourth embodiment, if the combining button 132 is pressed, the combined image generating unit 28 displays the generated combined image on the display unit 21.

When an input of the start signal for instructing to start EFI generation is received by the image start button 135, an extended focus image is generated based on the flowchart illustrated in FIG. 29.

In the fourth embodiment, a control unit 9D sets the operation of each of the units in the microscope to invalid (Step S201), and displays the image combining screen 120*m* on the display unit 21 (Step S202). The control unit 9D sets or acquires the exposure time of the imaging device 8 and acquires the transfer time of the image data (Step S203). The drive time setting unit 91 sets, based on the time of exposure and the transfer time, the lighting time T of the DF ring light source 6 (Step S204).

Then, the counter I of the DF ring light source 6 is initialized (I=1) (Step S205), and the imaging device 8 acquires the image data (Step S206). The control unit 9D determines whether the counter I of the DF ring light source 6 is 16 (Step S207). If the counter I is not 16 (No at Step S207), the control unit 9D performs control such that the lighting segment of the DF ring light source 6 rotates by one clockwise (CW direction) (Step S208). After having changed the lighting segment, the control unit 9D starts counting (Step S209) and outputs the image trigger "H-L" pulse (Step S210); the imaging device 8 acquires the image data (Step S211); and the image is stored in an image processing storage unit 23D together with segment information.

The control unit 9D determines whether T time has elapsed (Step S212) and, if T time has not elapsed (No at Step S212), the control unit 9D repeats the process at Step S212, whereas, if T time has elapsed (Yes at Step S212), the control unit 9D updates the counter I of the DF ring light source 6 (I=I+1) (Step S213), and returns to Step S207.

If the counter I is 16 (Yes at Step S207), the control unit 9D displays the picture image indicating that the counter I is 1 on the picture image display unit 128 (Step S214). The control unit 9D determines whether the combining button 132 has been pressed (Step S215) and, if the combining button 132 is not pressed (No at Step S215), the control unit 9D repeats the process at Step S215. If the combining button 132 has been pressed (Yes at Step S215), the combined image generating unit 28 calculates the contrast values of the selected picture images (Step S216), extracts pixels indicating high contrast values, and generates a combined image (Step S217); the control unit 9D sets the operation of the microscope to valid (Step S218); and generating a combined image is ended.

In the fourth embodiment, the picture image imaged by changing the lighting segment of the DF ring light source 6 may be observed for each image or may be observed by comparing the subject picture image with all of the picture images and thus an appropriate illumination condition in accordance with the specimen 2 may be easily searched. Furthermore, because the ring light source reproduction button 130 is included, an appropriate illumination condition may be automatically set by simply pressing the ring light source reproduction button 130. Furthermore, it is possible to generate a combined image by using picture images with high contrast.

In the fourth embodiment, a combined image is generated based on the picture images selected by an observer; however, the combined image may also be generated based on all picture images.

With the microscope system according to the present disclosure, an advantage is provided in that, even with a specimen in which the contrast is less likely to be exhibited, it is possible to obtain a combined image in which the contrast of the specimen is reflected.

Additional advantages and modifications will readily occur to those skilled in the art. Therefore, the disclosure in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A microscope system for observing a specimen via an objective lens that forms an observation image of the specimen, the microscope system comprising:
   a stage on which the specimen is mounted;
   a plurality of light sources configured to emit light irradiating the specimen, wherein the light sources include a DF (Dark Field) ring light source and a coaxial light source;
   an illumination optical system configured to irradiate the specimen with the light emitted from the light sources;
   an operating unit configured to receive selection of the light sources and setting of at least one of a state and an amount of light of each of the light sources;
   a focusing unit configured to move at least one of the stage and the objective lens in a direction orthogonal to a mounting surface on which the specimen is mounted to adjust a distance between the stage and the objective lens;
   an imaging unit configured to generate a plurality of pieces of image data by imaging the observation image of the specimen formed by the objective lens a plurality of times, wherein a lighting segment that emits light from among a plurality of segments of the DF ring light source is changed each time the imaging unit images the observation image to generate one of the pieces of image data; and
   a combined image generating unit configured to combine the plurality of pieces of image data generated by the imaging unit to generate combined image data,
   wherein:
   the microscope system enables selection of a state of optical elements constituting the illumination optical system and selection of a type, the state, and an amount of light of the light sources, in generating the plurality of pieces of image data that are combined by the combined image generating unit to generate the combined image data, and
   the combined image generating unit is an EFI (Extended Focus Imaging) generating unit configured to generate extended focus image data as the combined image data.

2. The microscope system according to claim 1, wherein the combined image generating unit is configured to generate the combined image data by calculating a contrast value for each pixel of the plurality of pieces of image data generated by the imaging unit and extracting and combining pixels indicating high contrast values.

3. The microscope system according to claim 1, further comprising a contrast map generating unit configured to generate a contrast map by combining the plurality of pieces of image data generated by the imaging unit having a luminance value with a highest contrast value for each pixel.

4. The microscope system according to claim 1, further comprising:
   an input unit configured to receive an input of an instruction signal for instructing to generate the combined image data; and a control unit configured to control the imaging unit and
the DF ring light source,
wherein when the instruction signal for instructing to
generate the combined image data is input via the input
unit, the control unit is configured to perform control so
as to automatically change the lighting segment that
emits light from among the plurality of segments of the
DF ring light source each time the imaging unit images
the observation image.

5. The microscope system according to claim 4, wherein
the control unit includes a drive time setting unit configured
to determine, based on an exposure time of the imaging unit
and a transfer time of the image data, lighting time of the DF
ring light source, and the control unit is configured to
perform controls, when the combined image generating unit
generates the combined image data, such that a change in the
lighting segment and imaging performed by the imaging unit
are synchronized.

6. The microscope system according to claim 1, further
comprising:
an input unit configured to receive an input of an instruction signal for instructing to generate the combined image data;
a control unit configured to control the imaging unit and the illumination optical system;
wherein:
the illumination optical system includes an aperture stop, and
the control unit is configured to automatically perform control, when the instruction signal for instructing to generate the combined image data is input via the input unit, such that an aperture diameter of the aperture stop is set to 60 to 80% of a pupil diameter of the objective lens to be used.

7. The microscope system according to claim 1, wherein:
the illumination optical system includes an aperture stop; and
the operating unit is configured to:
receive an input of an instruction signal for instructing an amount of light of the DF ring light source and the coaxial light source, selection of an illumination mode of the DF ring light source, rotation of the lighting segment that emits light from among the plurality of segments of the DF ring light source, and selection of an aperture of the aperture stop; and
select one of a mode in which extended focus image data is acquired in a state in which a change operation of the amount of light of the DF ring light source and the coaxial light source, selection of the illumination mode of the DF ring light source, rotation of the lighting segment of the DF ring light source, and selection of the aperture of the aperture stop performed via the operating unit is valid and a mode in which extended focus image data is acquired in a state in which a change operation of the amount of light of the DF ring light source and the coaxial light source, selection of an illumination mode of the DF ring light source, rotation of the lighting segment of the DF ring light source, and selection of the aperture of the aperture stop performed via the operating unit is invalid.

8. The microscope system according to claim 1, wherein the distance between the stage and the objective lens is adjusted and the lighting segment that emits light from among the plurality of segments of the DF ring light source is changed, each time the imaging unit images the observation image to generate one of the pieces of image data, such that each piece of image data is generated at a different focal position in the direction orthogonal to the mounting surface and with a different lighting segment of the DF ring light source emitting light.

9. The microscope system according to claim 1, wherein:
each segment of the DF ring light source comprises a plurality of individual LED illumination pieces,
each adjacent segment of the DF ring light source shares at least one individual LED illumination piece, and
each time the imaging unit images the observation image to generate one of the pieces of image data, the lighting segment that emits light from among the plurality of segments of the DF ring light source is changed to a next adjacent segment such that the changed lighting segment shares at least one individual LED illumination piece with the previous segment used as the lighting segment.

10. The microscope system according to claim 1, wherein:
a light emitting plane of the DF ring light source is located at a position in an optical path of the microscope system that is different from a position in the optical path at which a light emitting plane of a light emitting element of the coaxial light source is located.

11. A microscope system for observing a specimen via an objective lens that forms an observation image of the specimen, the microscope system comprising:
a stage on which the specimen is mounted;
a plurality of light sources configured to emit light irradiating the specimen, wherein the light sources include a DF (Dark Field) ring light source and a coaxial light source;
an illumination optical system configured to irradiate the specimen with the light emitted from the light sources;
a focusing unit configured to move at least one of the stage and the objective lens in a direction orthogonal to a mounting surface on which the specimen is mounted to adjust a distance between the stage and the objective lens;
a control unit configured to control a state of at least the DR ring light source;
an imaging unit configured to generate a plurality of pieces of image data by imaging the observation image of the specimen formed by the objective lens a plurality of times, wherein the control unit is configured to control the DF ring light source to change a lighting segment that emits light from among a plurality of segments of the DF ring light source each time the imaging unit images the observation image to generate one of the pieces of image data; and
a combined image generating unit configured to combine the plurality of pieces of image data generated by the imaging unit to generate combined image data.

\* \* \* \* \*